US012650655B2

(12) United States Patent
Iwasaki et al.

(10) Patent No.: US 12,650,655 B2
(45) Date of Patent: Jun. 9, 2026

(54) ELECTROPHOTOGRAPHIC PHOTORECEPTOR, PROCESS CARTRIDGE, AND IMAGE FORMING APPARATUS

(71) Applicant: FUJIFILM Business Innovation Corp., Tokyo (JP)

(72) Inventors: Masahiro Iwasaki, Kanagawa (JP); Yuki Oyamada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 566 days.

(21) Appl. No.: 18/190,105

(22) Filed: Mar. 26, 2023

(65) Prior Publication Data

US 2024/0027927 A1 Jan. 25, 2024

(30) Foreign Application Priority Data

Jul. 20, 2022 (JP) ................................. 2022-115850

(51) Int. Cl.
*G03G 5/06* (2006.01)
*G03G 21/18* (2006.01)
*G03G 9/087* (2006.01)

(52) U.S. Cl.
CPC ......... *G03G 5/0651* (2013.01); *G03G 5/0648* (2013.01); *G03G 21/1814* (2013.01); *G03G 21/1821* (2013.01); *G03G 9/087* (2013.01)

(58) Field of Classification Search
CPC ...................................................... G03G 5/142
See application file for complete search history.

(56) References Cited

U.S. PATENT DOCUMENTS

| | | | | |
|---|---|---|---|---|
| 5,286,587 | A | 2/1994 | Ashiya | |
| 8,632,931 | B2 | 1/2014 | Sekido et al. | |
| 2015/0185632 | A1 | 7/2015 | Sekido et al. | |
| 2018/0341190 | A1 | 11/2018 | Nishi et al. | |
| 2019/0310561 | A1 | 10/2019 | Nishi et al. | |
| 2020/0096884 | A1 | 3/2020 | Iwasaki et al. | |
| 2020/0341392 | A1 * | 10/2020 | Iwasaki | G03G 5/0546 |

FOREIGN PATENT DOCUMENTS

| | | | | |
|---|---|---|---|---|
| JP | H0264546 | | 3/1990 | |
| JP | H04264448 | | 9/1992 | |
| JP | 2003091086 | | 3/2003 | |
| JP | 2003330209 | | 11/2003 | |
| JP | 2003345044 | | 12/2003 | |
| JP | 2011-053592 | * | 3/2011 | G03G 5/14 |
| JP | 2011095665 | | 5/2011 | |

(Continued)

OTHER PUBLICATIONS

Translation of JP 2011-053592.*

(Continued)

*Primary Examiner* — Peter L Vajda
(74) *Attorney, Agent, or Firm* — JCIPRNET

(57) ABSTRACT

An electrophotographic photoreceptor includes a conductive substrate, an undercoat layer provided on the conductive substrate and containing a binder resin and an n-type organic pigment, and a photosensitive layer provided on the undercoat layer, in which an amount of an Fe element in the undercoat layer that is detected by high-frequency inductively coupled plasma emission spectrometric analysis is 80 ppm or less.

18 Claims, 2 Drawing Sheets

(56) References Cited

FOREIGN PATENT DOCUMENTS

| | | |
|---|---|---|
| JP | 5147274 | 2/2013 |
| JP | 2016136209 | 7/2016 |
| JP | 2020046640 | 3/2020 |

OTHER PUBLICATIONS

"Search Report of Europe Counterpart Application", issued on Nov. 28, 2023, pp. 1-8.
"Decision of Refusal of Japan Counterpart Application", issued on Mar. 17, 2026, with English translation thereof, pp. 1-6.

* cited by examiner

ELECTROPHOTOGRAPHIC PHOTORECEPTOR, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2022-115850 filed Jul. 20, 2022.

BACKGROUND

(i) Technical Field

The present invention relates to an electrophotographic photoreceptor, a process cartridge, and an image forming apparatus.

(ii) Related Art

JP2003-091086A discloses an electrophotographic photoreceptor including a conductive support layer, a photosensitive layer containing a pigment, and an interlayer disposed between the conductive support layer and the photosensitive layer, in which the interlayer contains metal oxide particles subjected to a coating treatment with a coupling agent and a binder resin, the interlayer has a layer thickness of greater than 20 μm and 50 μm or less, and the binder resin is a thermosetting resin.

JP2003-330209A discloses an electrophotographic photoreceptor including an interlayer and a photosensitive layer in this order on a support, in which the interlayer contains a polymer of an electron transport substance containing a non-hydrolyzable polymerizable functional group.

JP2003-345044A discloses an electrophotographic photoreceptor including an interlayer and a photosensitive layer in this order on a support, in which the interlayer contains a resin having a repeating structural unit represented by Formula (1), and the ratio of the repeating structural unit represented by Formula (1) to all repeating structural units of the resin is 80% or greater and less than 100%.

JP5147274B discloses an electrophotographic photoreceptor including a conductive support, an interlayer on the conductive support, and a photosensitive layer on the interlayer, in which the interlayer contains a specific imide compound.

JP2011-095665A discloses an electrophotographic photoreceptor including an interlayer and a photosensitive layer in this order on a conductive support, in which the interlayer contains a polyolefin resin and an organic electron transport substance, the polyolefin resin is a specific polyolefin resin, and the organic electron transport substance is a compound selected from the group consisting of an imide-based compound, a benzimidazole-based compound, a quinone-based compound, a cyclopentadienylidene-based compound, an azo-based compound, and derivatives thereof.

SUMMARY

In the related art, in a case where an electrophotographic photoreceptor including an undercoat layer that contains a binder resin and an n-type organic pigment is used, a leakage current is locally generated, and accordingly, spot-like image defects are found in some cases. Further, in a case where needle-like foreign matter is stuck into the surface of a photoreceptor, the degree of leakage current in the portion into which the foreign matter has been stuck is likely to further increase. Therefore, aspects of non-limiting embodiments of the present disclosure relate to an electrophotographic photoreceptor that suppresses spot-like image defects as compared with a case where the amount of an Fe element in the undercoat layer that is detected by high-frequency inductively coupled plasma emission spectrometric analysis is greater than 80 ppm.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

Specific means for achieving the above-described object includes the following aspect.

According to an aspect of the present disclosure, there is provided an electrophotographic photoreceptor including: a conductive substrate; an undercoat layer provided on the conductive substrate and containing a binder resin and an n-type organic pigment; and a photosensitive layer provided on the undercoat layer, in which an amount of an Fe element in the undercoat layer that is detected by high-frequency inductively coupled plasma emission spectrometric analysis is 80 ppm or less.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the present disclosure will be described. The following descriptions and examples merely illustrate the exemplary embodiments, and do not limit the scope of the exemplary embodiments.

In the present disclosure, a numerical range shown using "to" indicates a range including numerical values described before and after "to" as a minimum value and a maximum value.

In a numerical range described in a stepwise manner in the present disclosure, an upper limit value or a lower limit value described in a certain numerical range may be replaced with an upper limit value or a lower limit value in another numerical range described in a stepwise manner. Further, in a numerical range described in the present disclosure, an upper limit value or a lower limit value described in the numerical range may be replaced with a value shown in Examples.

In the present disclosure, each component may include a plurality of kinds of substances corresponding to each component. In the present disclosure, in a case where a plurality of kinds of substances corresponding to each component in a composition are present, the amount of each component in the composition indicates the total amount of the plurality of kinds of substances present in the composition unless otherwise specified.

In the present disclosure, an electrophotographic photoreceptor is also simply referred to as a photoreceptor.

In the present disclosure, a compound represented by General Formula (1) is referred to as a perinone compound (1), and the compound represented by General Formula (2) is referred to as a perinone compound (2).

Electrophotographic Photoreceptor

An electrophotographic photoreceptor according to the present exemplary embodiment is an electrophotographic photoreceptor including a conductive substrate, an undercoat layer provided on the conductive substrate and containing a binder resin and an n-type organic pigment, and a photosensitive layer provided on the undercoat layer, in which an amount of an Fe element in the undercoat layer that is detected by high-frequency inductively coupled plasma emission spectrometric analysis is 80 ppm or less.

The photoreceptor according to the present exemplary embodiment includes a conductive substrate, an undercoat layer disposed on the conductive substrate, and a photosensitive layer disposed on the undercoat layer.

Figure 1:
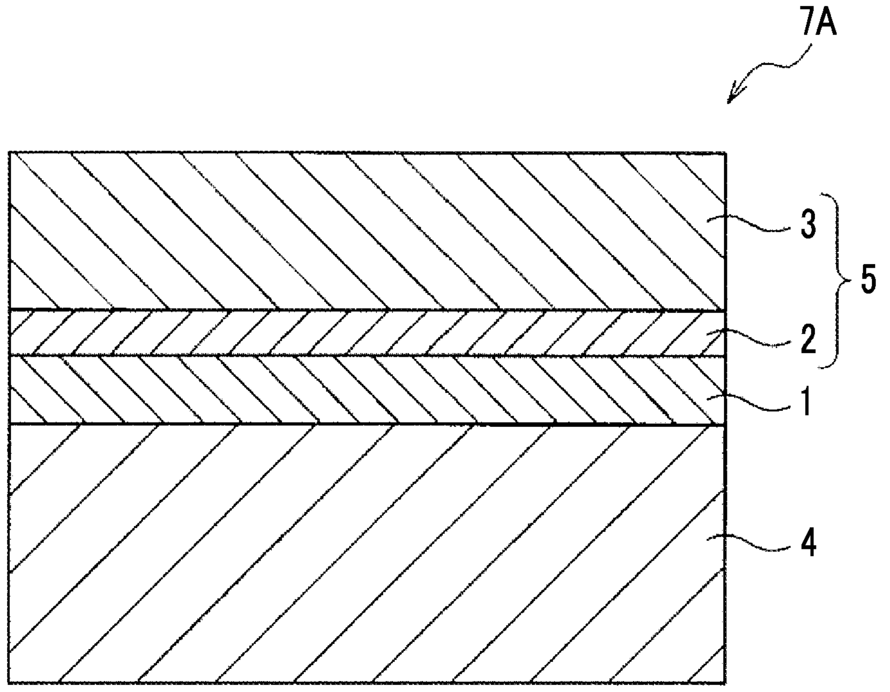
FIG. 1 is a schematic partial cross-sectional view showing an example of a layer configuration of an electrophotographic photoreceptor according to the present exemplary embodiment.

FIG. 1 schematically shows an example of the layer configuration of the photoreceptor according to the present exemplary embodiment. A photoreceptor 7A shown in FIG. 1 has a structure in which an undercoat layer 1, a charge generation layer 2, and a charge transport layer 3 are laminated in this order on a conductive substrate 4. The charge generation layer 2 and the charge transport layer 3 constitute a photosensitive layer 5. The photoreceptor 7A may have a layer configuration in which a protective layer is further provided on the charge transport layer 3.

In the photoreceptor according to the present exemplary embodiment, the photosensitive layer may be a function separation type photosensitive layer in which the charge generation layer 2 and the charge transport layer 3 are separated as in the photoreceptor 7A shown in FIG. 1 or may be a single layer type photosensitive layer having a charge generation ability and a charge transport ability in place of the charge generation layer 2 and the charge transport layer 3.

In the electrophotographic photoreceptor according to the present exemplary embodiment, the amount of the Fe element in the undercoat layer that is detected by high-frequency inductively coupled plasma emission spectrometric analysis is 80 ppm or less.

In recent years, an n-type organic pigment has been used as one of the materials for adjusting the electrical characteristics of an undercoat layer. Since an undercoat layer containing the n-type organic pigment has a high resistance and holds the charge at an interface between an aluminum base material and the undercoat layer during charging as compared with a case where n-type metal oxide particles such as titanium oxide, zinc oxide, or tin oxide of the related art are used, a charge retention properties is likely to be locally lost due to the influence of aggregation of impurities. In particular, in a case where the undercoat layer contains an Fe element as an impurity, a leakage current is likely to be locally generated due to the presence of the Fe element. In this manner, spot-like image defects are likely to occur in a case where images are repeatedly formed. Further, for example, in a case where needle-like foreign matter mixed into a toner cartridge is stuck into the surface of an electrophotographic photoreceptor, the electric field is likely to be concentrated in a case where impurities are present, and spot-like image defects are more likely to occur.

On the other hand, since the electrophotographic photoreceptor according to the present exemplary embodiment has the above-described configuration, the leakage current is suppressed. The mechanism is not necessarily clear, but it is assumed as follows.

In the electrophotographic photoreceptor according to the present exemplary embodiment, the amount of the Fe element in the undercoat layer that is detected by high-frequency inductively coupled plasma emission spectrometric analysis is 80 ppm or less. Therefore, a local leakage current due to the presence of the Fe element is reduced. As a result, spot-like image defects are suppressed even in a case where images are repeatedly formed. Further, for example, even in a case where needle-like foreign matter mixed into a toner cartridge or foreign matter generated from abrasion of a plastic gear is stuck into the surface of the electrophotographic photoreceptor, the leakage current resistance is maintained and occurrence of spot-like image defects is suppressed.

Hereinafter, each layer of the photoreceptor according to the present exemplary embodiment will be described in detail.

Undercoat Layer

The undercoat layer contains a binder resin and an n-type organic pigment.

The undercoat layer may contain other materials in addition to the binder resin and the n-type organic pigment.

The amount of the Fe element in the undercoat layer that is detected by high-frequency inductively coupled plasma emission spectrometric analysis is 80 ppm or less, for example, preferably 60 ppm or less, and more preferably 50 ppm or less. The amount of the Fe element detected by the high-frequency inductively coupled plasma emission spectrometric analysis is, for example, preferably 10 ppm or less as an allowable amount that does not affect the effects of the present disclosure and more preferably less than or equal to the detection limit.

In a case where the amount of the Fe element is less than or equal to the upper limit of the above-described ranges, a local leakage current is further suppressed. As a result, the frequency of occurrence of spot-like image defects caused by the local leakage current is likely to be reduced.

The high-frequency inductively coupled plasma emission spectrometric analysis is carried out by peeling the undercoat layer off from the electrophotographic photoreceptor and performing measurement using 7800 ICP-MS (manufactured by Agilent Technologies Inc.).

The method of setting the amount of the Fe element to be less than or equal to the upper limit of the above-described ranges is not particularly limited, and examples thereof include a recrystallized material, a sublimation purified material, an acid paste-treated material, and a silica gel-treated material which are obtained by removing the impurities contained in the n-type organic pigment by performing recrystallization, sublimation purification, acid pasting, and a silica gel treatment.

Binder Resin

Examples of the binder resin used for the undercoat layer include known polymer compounds such as an acetal resin (such as polyvinyl butyral), a polyvinyl alcohol resin, a polyvinyl acetal resin, a casein resin, a polyamide resin, a cellulose resin, gelatin, a polyurethane resin, a polyester resin, an unsaturated polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a urea resin, a phenol resin, a phenol-formaldehyde resin, a melamine resin, an alkyd resin, and an epoxy resin, a zirconium chelate compound, a titanium chelate compound, an aluminum chelate compound, a titanium alkoxide compound, an organic titanium compound, and known materials such as a silane coupling agent.

Examples of the binder resin used for the undercoat layer include a charge-transporting resin containing a charge-transporting group, and a conductive resin (such as polyaniline).

Among these, as the binder resin used for the undercoat layer, for example, a resin insoluble in a coating solvent of the upper layer is preferable, a resin obtained by a reaction between a curing agent and at least one resin selected from the group consisting of a thermosetting resin such as a urea resin, a phenol resin, a phenol-formaldehyde resin, a melamine resin, a urethane resin, an unsaturated polyester resin, an alkyd resin, or an epoxy resin; a polyamide resin, a polyester resin, a polyether resin, a methacrylic resin, an acrylic resin, a polyvinyl alcohol resin, and a polyvinyl acetal resin is particularly preferable, and a resin obtained by a reaction between a urethane resin and a curing agent is more preferable.

In a case where these binder resins are used in combination of two or more kinds thereof, the mixing ratio thereof is set as necessary.

Hereinafter, the resin obtained by a reaction between a urethane resin and a curing agent will be referred to as "curing type urethane resin" for convenience.

Polyurethane Resin

A polyurethane resin is typically synthesized by a polyaddition reaction between a polyfunctional isocyanate and a polyol.

Examples of the polyfunctional isocyanate include a diisocyanate such as methylene diisocyanate, ethylene diisocyanate, isophorone diisocyanate, hexamethylene diisocyanate, 1,4-cyclohexane diisocyanate, 2,4-toluene diisocyanate, 2,6-toluene diisocyanate, 1,3-xylylene diisocyanate, 1,5-naphthalene diisocyanate, m-phenylene diisocyanate, p-phenylene diisocyanate, 3,3'-dimethyl-4,4'-diphenylmethane diisocyanate, 3,3'-dimethylbiphenylene diisocyanate, 4,4'-biphenylene diisocyanate, dicyclohexylmethane diisocyanate, or methylenebis(4-cyclohexyl isocyanate); an isocyanurate obtained by trimerizing the diisocyanate; and a blocked isocyanate in which the isocyanate group of the diisocyanate is blocked with a blocking agent. The polyfunctional isocyanate may be used alone or in combination of two or more kinds thereof.

Examples of the polyol include diols such as ethylene glycol, 1,2-propanediol, 1,3-propanediol, 1,2-butanediol, 1,3-butanediol, 2,3-butanediol, 2,2-dimethyl-1,3-propanediol, 1,2-pentanediol, 1,4-pentanediol, 1,5-pentanediol, 2,4-pentanediol, 3,3-dimethyl-1,2-butanediol, 2-ethyl-2-methyl-1,3-propanediol, 1,2-hexanediol, 1,5-hexanediol, 1,6-hexanediol, 2,5-hexanediol, 2-methyl-2,4-pentanediol, 2,2-diethyl-1,3-propanediol, 2,4-dimethyl-2,4-pentanediol, 1,7-heptanediol, 2-methyl-2-propyl-1,3-propanediol, 2,5-dimethyl-2,5-hexanediol, 2-ethyl-1,3-hexanediol, 1,2-octanediol, 1,8-octanediol, 2,2,4-trimethyl-1,3-pentanediol, 1,4-cyclohexanedimethanol, hydroquinone, diethylene glycol, triethylene glycol, dipropylene glycol, tripropylene glycol, polyethylene glycol, polypropylene glycol, poly(oxytetramethylene) glycol, 4,4'-dihydroxy-diphenyl-2,2-propane, and 4,4'-dihydroxyphenylsulfone.

Examples of the polyol further include polyester polyol, polycarbonate polyol, polycaprolactone polyol, polyether polyol, and polyvinyl butyral.

The polyol may be used alone or in combination of two or more kinds thereof.

The content of the polyurethane resin in the binder resin contained in the undercoat layer is, for example, preferably 80% by mass or greater and 100% by mass or less, more preferably 90% by mass or greater and 100% by mass or less, and still more preferably 95% by mass or greater and 100% by mass or less with respect to the total amount of the binder resin.

The ratio of the total content of the n-type organic pigment contained in the undercoat layer to the content of the polyurethane resin contained in the undercoat layer (n-type organic pigment:polyurethane resin) in terms of mass is, for example, preferably in a range of 40:60 to 80:20 and more preferably in a range of 50:50 to 70:30.

n-Type Organic Pigment

Examples of the n-type organic pigment include a perinone-based compound, a naphthalenetetracarboxydiimide-based compound, a perylenetetracarboxylic acid diimide-based compound, a quinone-based compound such as p-benzoquinone, chloranyl, bromanyl, or anthraquinone, a tetracyanoquinodimethane-based compound, a fluorenone compound such as 2,4,7-trinitrofluorenone, a dinaphthoquinone compound, a diphenoquinone compound, a xanthone-based compound, a benzophenone-based compound, a cyanovinyl-based compound, and an ethylene-based compound. The n-type organic pigment may be used alone or in a mixture of two or more kinds thereof.

It is preferable that the n-type organic pigment includes, for example, at least one n-type organic pigment selected from the group consisting of compounds represented by General Formulae (1), (2), (3), (4), and (5).

General Formula (1)

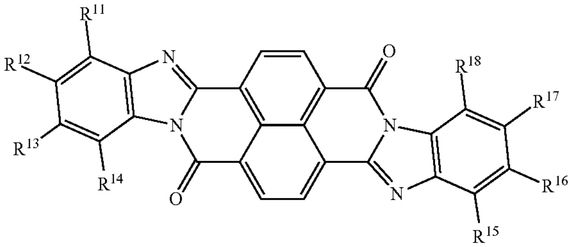

General Formula (2)

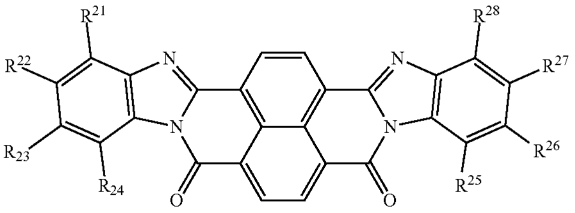

General Formula (3)

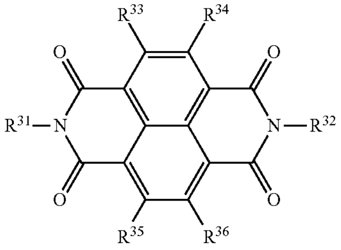

-continued

General Formula (4)

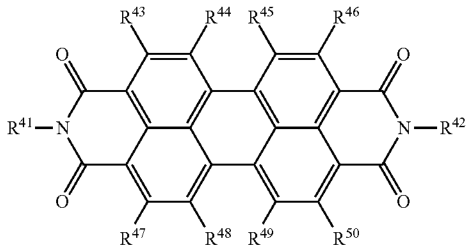

General Formula (5)

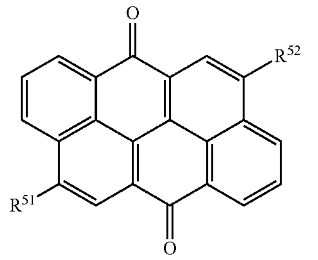

In General Formula (1), $R^{11}$, $R^{12}$, $R^{13}$, $R^{14}$, $R^{15}$, $R^{16}$, $R^{17}$, and $R^{18}$ each independently represent a hydrogen atom, an alkyl group, an alkoxy group, an aralkyl group, an aryl group, an aryloxy group, an alkoxycarbonyl group, an aryloxycarbonyl group, an alkoxycarbonylalkyl group, an aryloxycarbonylalkyl group, or a halogen atom. $R^{11}$ and $R^{12}$, $R^{12}$ and $R^{13}$, and $R^{13}$ and $R^{14}$ may be each independently linked to each other to form a ring, and $R^{15}$ and $R^{16}$, $R^{16}$ and $R^{17}$, and $R^{17}$ and $R^{18}$ may be each independently linked to each other to form a ring.

In General Formula (2), $R^{21}$, $R^{22}$, $R^{23}$, $R^{24}$, $R^{25}$, $R^{26}$, $R^{27}$, and $R^{28}$ each independently represent a hydrogen atom, an alkyl group, an alkoxy group, an aralkyl group, an aryl group, an aryloxy group, an alkoxycarbonyl group, an aryloxycarbonyl group, an alkoxycarbonylalkyl group, an aryloxycarbonylalkyl group, or a halogen atom. $R^{21}$ and $R^{22}$, $R^{22}$ and $R^{23}$, and $R^{23}$ and $R^{24}$ may be each independently linked to each other to form a ring, and $R^{25}$ and $R^{26}$, $R^{26}$ and $R^{27}$, and $R^{27}$ and $R^{28}$ may be each independently linked to each other to form a ring.

In General Formula (3), $R^{31}$, $R^{32}$, $R^{33}$, $R^{34}$, $R^{35}$, and $R^{36}$ each independently represent a hydrogen atom, an alkyl group, an alkoxy group, an aralkyl group, an aryl group, an alkoxycarbonyl group, or a halogen atom.

In General Formula (4), $R^{41}$, $R^{42}$, $R^{43}$, $R^{44}$, $R^{45}$, $R^{46}$, $R^{47}$, $R^{48}$, $R^{49}$, and $R^{50}$ each independently represent a hydrogen atom, an alkyl group, an alkoxy group, an aralkyl group, an aryl group, an alkoxycarbonyl group, or a halogen atom.

In General Formula (5), $R^{51}$ and $R^{52}$ each independently represent a hydrogen atom, an alkyl group, an alkoxy group, an aralkyl group, an aryl group, an alkoxycarbonyl group, or a halogen atom.

In a case where the n-type organic pigment is at least one n-type organic pigment selected from the group consisting of compounds represented by General Formulae (1) to (5), the n-type organic pigment is likely to be present with high dispersibility in the undercoat layer, uniform electron transport can be made in the film, and excellent electron transport properties are exhibited.

Among the compounds, the n-type organic pigment includes, for example, preferably at least one n-type organic pigment selected from the group consisting of the compounds represented by General Formulae (1), (2), (4), and (5), more preferably at least one n-type organic pigment selected from the group consisting of the compounds represented by General Formulae (1), (2), and (4), still more preferable at least one of the compound represented by General Formula (1) or the compound represented by General Formula (2), and particularly preferable the compound represented by General Formula (1).

The undercoat layer containing the compound as the n-type organic pigment has high dispersibility in a resin and is capable of achieving both high charging properties and high electron transport properties. Although the influence of a trace amount of the iron component on the initial electrical properties of the photoreceptor is small, spot-like image defects may severely occur in a case where images are repeatedly formed. From the above-described viewpoint and the viewpoint that the above-described compounds are purified in various manners, the amount of the Fe element is easily adjusted to 80 ppm or less, and excellent image quality maintainability is exhibited.

Compounds Represented by General Formulae (1) and (2)

Hereinafter, the compounds represented by General Formulae (1) and (2) will be described.

General Formula (1)

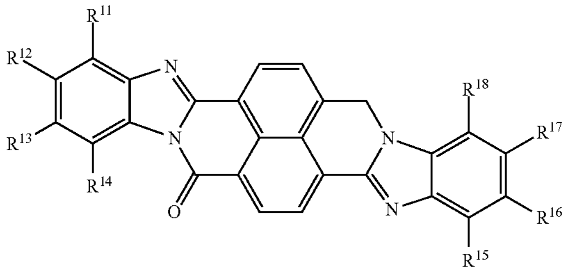

General Formula (2)

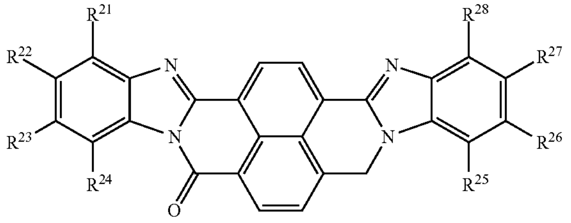

In General Formula (1), $R^{11}$, $R^{12}$, $R^{13}$, $R^{14}$, $R^{15}$, $R^{16}$, $R^{17}$, and $R^{18}$ (hereinafter, also simply referred to as "$R^{11}$ to $R^{18}$") each independently represent a hydrogen atom, an alkyl group, an alkoxy group, an aralkyl group, an aryl group, an aryloxy group, an alkoxycarbonyl group, an aryloxycarbonyl group, an alkoxycarbonylalkyl group, an aryloxycarbonylalkyl group, or a halogen atom. $R^{11}$ and $R^{12}$, $R^{12}$ and $R^{13}$, and $R^{13}$ and $R^{14}$ may be each independently linked to each other to form a ring. $R^{15}$ and $R^{16}$, $R^{16}$ and $R^{17}$, and $R^{17}$ and $R^{18}$ may be each independently linked to each other to form a ring.

In General Formula (2), $R^{21}$, $R^{22}$, $R^{23}$, $R^{24}$, $R^{25}$, $R^{26}$, $R^{27}$, and $R^{28}$ (hereinafter, also simply referred to as "$R^{21}$ to $R^{28}$") each independently represent a hydrogen atom, an alkyl group, an alkoxy group, an aralkyl group, an aryl group, an aryloxy group, an alkoxycarbonyl group, an aryloxycarbonyl group, an alkoxycarbonylalkyl group, an aryloxycarbonylalkyl group, or a halogen atom. $R^{21}$ and $R^{22}$, $R^{22}$ and $R^{23}$, and $R^{23}$ and $R^{24}$ may be each independently linked to each other to form a ring. $R^{25}$ and $R^{26}$, $R^{26}$ and $R^{27}$, and $R^{27}$ and $R^{28}$ may be each independently linked to each other to form a ring.

Examples of the alkyl group represented by $R^{11}$ to $R^{18}$ in General Formula (1) include a substituted or unsubstituted alkyl group.

Examples of the unsubstituted alkyl group represented by $R^{11}$ to $R^{18}$ in General Formula (1) include a linear alkyl group having 1 or more and 20 or less carbon atoms (for example, preferably 1 or more and 10 or less carbon atoms and more preferably 1 or more and 6 or less carbon atoms), a branched alkyl group having 3 or more and 20 or less carbon atoms (for example, preferably 3 or more and 10 or less carbon atoms), and a cyclic alkyl group having 3 or more and 20 or less carbon atoms (for example, preferably 3 or more and 10 or less carbon atoms).

Examples of the linear alkyl group having 1 or more and 20 or less carbon atoms include a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, an n-dodecyl group, a tridecyl group, an n-tetradecyl group, an n-pentadecyl group, an n-heptadecyl group, an n-octadecyl group, an n-nonadecyl group, and an n-icosyl group.

Examples of the branched alkyl group having 3 or more and 20 or less carbon atoms include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, a tert-decyl group, an isododecyl group, a sec-dodecyl group, a tert-dodecyl group, a tert-tetradecyl group, and a tert-pentadecyl group.

Examples of the cyclic alkyl group having 3 or more and 20 or less carbon atoms include a cyclopropyl group, a cyclobutyl group, a cyclopentyl group, a cyclohexyl group, a cycloheptyl group, a cyclooctyl group, a cyclononyl group, a cyclodecyl group, and polycyclic (for example, bicyclic, tricyclic, or spirocyclic) alkyl groups formed by these monocyclic alkyl groups being linked to each other.

Among these, for example, a linear alkyl group such as a methyl group or an ethyl group is preferable as the unsubstituted alkyl group.

Examples of the substituent in the alkyl group include an alkoxy group, a hydroxy group, a carboxy group, a nitro group, and a halogen atom (such as a fluorine atom, a bromine atom, or an iodine atom).

Examples of the alkoxy group that substitutes the hydrogen atom in the alkyl group include the same groups as the groups for the unsubstituted alkoxy group represented by $R^{11}$ to $R^{18}$ in General Formula (1).

Examples of the alkoxy group represented by $R^{11}$ to $R^{18}$ in General Formula (1) include a substituted or unsubstituted alkoxy group.

Examples of the unsubstituted alkoxy group represented by $R^{11}$ to $R^{18}$ in General Formula (1) include a linear, branched, or cyclic alkoxy group having 1 or more and 10 or less carbon atoms (for example, preferably 1 or more and 6 or less carbon atoms and more preferably 1 or more and 4 or less carbon atoms).

Specific examples of the linear alkoxy group include a methoxy group, an ethoxy group, an n-propoxy group, an n-butoxy group, an n-pentyloxy group, an n-hexyloxy group, an n-heptyloxy group, and an n-octyloxy group, an n-nonyloxy group, and an n-decyloxy group.

Specific examples of the branched alkoxy group include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, a tert-hexyloxy group, an isoheptyloxy group, a sec-heptyloxy group, a tert-heptyloxy group, an isooctyloxy group, a sec-octyloxy group, a tert-octyloxy group, an isononyloxy group, a sec-nonyloxy group, a tert-nonyloxy group, an isodecyloxy group, a sec-decyloxy group, and a tert-decyloxy group.

Specific examples of the cyclic alkoxy group include a cyclopropoxy group, a cyclobutoxy group, a cyclopentyloxy group, a cyclohexyloxy group, a cycloheptyloxy group, a cyclooctyloxy group, a cyclononyloxy group, and a cyclodecyloxy group.

Among these, for example, a linear alkoxy group is preferable as the unsubstituted alkoxy group.

Examples of the substituent in the alkoxy group include an aryl group, an alkoxycarbonyl group, an aryloxycarbonyl group, a hydroxy group, a carboxy group, a nitro group, and a halogen atom (such as a fluorine atom, a bromine atom, or an iodine atom).

Examples of the aryl group that substitutes a hydrogen atom in the alkoxy group include the same groups as the groups for the unsubstituted aryl group represented by $R^{11}$ to $R^{18}$ in General Formula (1).

Examples of the alkoxycarbonyl group that substitutes a hydrogen atom in the alkoxy group include the same groups as the groups for the unsubstituted alkoxycarbonyl group represented by $R^{11}$ to $R^{18}$ in General Formula (1).

Examples of the aryloxycarbonyl group that substitutes a hydrogen atom in the alkoxy group include the same groups as the groups for the unsubstituted aryloxycarbonyl group represented by $R^{11}$ to $R^{18}$ in General Formula (1).

Examples of the aralkyl group represented by $R^{11}$ to $R^{18}$ in General Formula (1) include a substituted or unsubstituted aralkyl group.

In General Formula (1), as the unsubstituted aralkyl group represented by $R^{11}$ to $R^{18}$, for example, an aralkyl group having 7 or more and 30 or less carbon atoms is preferable, an aralkyl group having 7 or more and 16 or less carbon atoms is more preferable, and an aralkyl group having 7 or more and 12 or less carbon atoms is still more preferable.

Examples of the unsubstituted aralkyl group having 7 or more and 30 or less carbon atoms include a benzyl group, a phenylethyl group, a phenylpropyl group, a 4-phenylbutyl group, a phenylpentyl group, a phenylhexyl group, a phenylheptyl group, a phenyloctyl group, a phenylnonyl group, a naphthylmethyl group, a naphthylethyl group, an anthracenylmethyl group, and a phenyl-cyclopentylmethyl group.

Examples of the substituent in the aralkyl group include an alkoxy group, an alkoxycarbonyl group, an aryloxycarbonyl group, and a halogen atom (such as a fluorine atom, a bromine atom, or an iodine atom).

Examples of the alkoxy group that substitutes a hydrogen atom in the aralkyl group include the same groups as the groups for the unsubstituted alkoxy group represented by $R^{11}$ to $R^{18}$ in General Formula (1).

Examples of the alkoxycarbonyl group that substitutes a hydrogen atom in the aralkyl group include the same groups as the groups for the unsubstituted alkoxycarbonyl group represented by $R^{11}$ to $R^{18}$ in General Formula (1).

Examples of the aryloxycarbonyl group that substitutes a hydrogen atom in the aralkyl group include the same groups as the groups for the unsubstituted aryloxycarbonyl group represented by $R^{11}$ to $R^{18}$ in General Formula (1).

Examples of the aryl group represented by $R^{11}$ to $R^{18}$ in General Formula (1) include a substituted or unsubstituted aryl group.

As the unsubstituted aryl group represented by $R^{11}$ to $R^{18}$ in General Formula (1), for example, an aryl group having 6 or more and 30 or less carbon atoms is preferable, an aryl group having 6 or more and 14 or less carbon atoms is more preferable, and an aryl group having 6 or more and 10 or less carbon atoms is still more preferable.

Examples of the aryl group having 6 or more and 30 or less carbon atoms include a phenyl group, a biphenyl group, a 1-naphthyl group, a 2-naphthyl group, a 9-anthryl group, a 9-phenanthryl group, a 1-pyrenyl group, a 5-naphthacenyl group, a 1-indenyl group, a 2-azulenyl group, a 9-fluorenyl group, a biphenylenyl group, an indacenyl group, a fluoranthenyl group, an acenaphthylenyl group, an aceanthrylenyl group, a phenalenyl group, a fluorenyl group, an anthryl group, a bianthracenyl group, a teranthracenyl group, a quarter anthracenyl group, an anthraquinolyl group, a phenanthryl group, a triphenylenyl group, a pyrenyl group, a chrysenyl group, a naphthacenyl group, a preadenyl group, a picenyl group, a perylenyl group, a pentaphenyl group, a pentacenyl group, tetraphenylenyl group, a hexaphenyl group, a hexacenyl group, a rubisenyl group, and a coronenyl group. Among these, for example, a phenyl group is preferable.

Examples of the substituent in the aryl group include an alkyl group, an alkoxy group, an alkoxycarbonyl group, an aryloxycarbonyl group, and a halogen atom (such as a fluorine atom, a bromine atom, or an iodine atom).

Examples of the alkyl group that substitutes a hydrogen atom in the aryl group include the same groups as the groups for the unsubstituted alkyl group represented by $R^{11}$ to $R^{18}$ in General Formula (1).

Examples of the alkoxy group that substitutes a hydrogen atom in the aryl group include the same groups as the groups for the unsubstituted alkoxy group represented by $R^{11}$ to $R^{18}$ in General Formula (1).

Examples of the alkoxycarbonyl group that substitutes a hydrogen atom in the aryl group include the same groups as the groups for the unsubstituted alkoxycarbonyl group represented by $R^{11}$ to $R^{18}$ in General Formula (1).

Examples of the aryloxycarbonyl group that substitutes a hydrogen atom in the aryl group include the same groups as the groups for the unsubstituted aryloxycarbonyl group represented by $R^{11}$ to $R^{18}$ in General Formula (1).

Examples of the aryloxy group represented by $R^{11}$ to $R^{18}$ (—O—Ar, Ar represent an aryl group) in General Formula (1) include a substituted or unsubstituted aryloxy group.

As the unsubstituted aryloxy group represented by $R^{11}$ to $R^{18}$ in General Formula (1), for example, an aryloxy group having 6 or more and 30 or less carbon atoms is preferable, an aryloxy group having 6 or more and 14 or less carbon atoms is more preferable, and an aryloxy group having 6 or more and 10 or less carbon atoms is still more preferable.

Examples of the aryloxy group having 6 or more and 30 or less carbon atoms include a phenyloxy group (phenoxy group), a biphenyloxy group, a 1-naphthyloxy group, a 2-naphthyloxy group, a 9-anthryloxy group, a 9-phenanthryloxy group, a 1-pyrenyloxy group, a 5-naphthacenyloxy group, a 1-indenyloxy group, a 2-azulenyloxy group, a 9-fluorenyloxy group, a biphenylenyloxy group, an indacenyloxy group, a fluoranthenyloxy group, an acenaphthylenyloxy group, an aceanthryleneyloxy group, a phenalenyloxy group, a fluorenyloxy group, an anthryloxy group, a bianthracenyloxy group, a teranthracenyloxy group, a quarter anthracenyloxy group, an anthraquinolyloxy group, a phenanthryloxy group, a triphenylenyloxy group, a pyrenyloxy group, a chrysenyloxy group, a naphthacenyloxy group, a preadenyloxy group, a picenyloxy group, a perylenyloxy group, a pentaphenyloxy group, a pentacenyloxy group, a tetraphenylenyloxy group, a hexaphenyloxy group, a hexacenyloxy group, a rubisenyloxy group, and a coronenyloxy group. Among these, for example, a phenyloxy group (phenoxy group) is preferable.

Examples of the substituent in the aryloxy group include an alkyl group, an alkoxycarbonyl group, an aryloxycarbonyl group, and a halogen atom (such as a fluorine atom, a bromine atom, or an iodine atom).

Examples of the alkyl group that substitutes a hydrogen atom in the aryloxy group include the same groups as the groups for the unsubstituted alkyl group represented by $R^{11}$ to $R^{18}$ in General Formula (1).

Examples of the alkoxycarbonyl group that substitutes a hydrogen atom in the aryloxy group include the same groups as the groups for the unsubstituted alkoxycarbonyl group represented by $R^{11}$ to $R^{18}$ in General Formula (1).

Examples of the aryloxycarbonyl group that substitutes a hydrogen atom in the aryloxy group include the same groups as the groups for the unsubstituted aryloxycarbonyl group represented by $R^{11}$ to $R^{18}$ in General Formula (1).

Examples of the alkoxycarbonyl group represented by $R^{11}$ to $R^{18}$ (—CO—OR, R represent an alkyl group) in General Formula (1) include a substituted or unsubstituted alkoxycarbonyl group.

The number of carbon atoms of the alkyl chain in the unsubstituted alkoxycarbonyl group represented by $R^{11}$ to $R^{18}$ in General Formula (1) is, for example, preferably 1 or more and 20 or less, more preferably 1 or more and 15 or less, and still more preferably 1 or more and 10 or less.

Examples of the alkoxycarbonyl group having 1 or more and 20 or less carbon atoms in the alkyl chain include a methoxycarbonyl group, an ethoxycarbonyl group, a propoxycarbonyl group, an isopropoxycarbonyl group, an n-butoxycarbonyl group, a sec-butoxybutylcarbonyl group, and a tert-butoxycarbonyl group, a pentaoxycarbonyl group, a hexaoxycarbonyl group, a heptaoxycarbonyl group, an octaoxycarbonyl group, a nonaoxycarbonyl group, a decaoxycarbonyl group, a dodecaoxycarbonyl group, a tridecaoxycarbonyl group, a tetradecaoxycarbonyl group, a pentadecaoxycarbonyl group, a hexadecaoxycarbonyl group, a heptadecaoxycarbonyl group, an octadecaoxycarbonyl group, a nonadecaoxycarbonyl group, and an icosaoxycarbonyl group.

Examples of the substituent in the alkoxycarbonyl group include an aryl group, a hydroxy group, and a halogen atom (such as a fluorine atom, a bromine atom, or an iodine atom).

Examples of the aryl group that substitutes a hydrogen atom in the alkoxycarbonyl group include the same groups as the groups for the unsubstituted aryl group represented by $R^{11}$ to $R^{18}$ in General Formula (1).

Examples of the aryloxycarbonyl group represented by $R^{11}$ to $R^{18}$ (—CO—OAr, Ar represents an aryl group) in General Formula (1) include a substituted or unsubstituted aryloxycarbonyl group.

The number of carbon atoms of the aryl group in the unsubstituted aryloxycarbonyl group represented by $R^{11}$ to $R^{18}$ in General Formula (1) is, for example, preferably 6 or more and 30 or less, more preferably 6 or more and 14 or less, and still more preferably 6 or more and 10 or less.

Examples of the aryloxycarbonyl group containing an aryl group with 6 or more and 30 or less carbon atoms include a phenoxycarbonyl group, a biphenyloxycarbonyl group, a 1-naphthyloxycarbonyl group, a 2-naphthyloxycarbonyl group, a 9-anthryloxycarbonyl group, a 9-phenanthryloxycarbonyl group, a 1-pyrenyloxycarbonyl group, a 5-naphthacenyloxycarbonyl group, a 1-indenyloxycarbonyl group, a 2-azulenyloxycarbonyl group, a 9-fluorenyloxycarbonyl group, a biphenylenyloxycarbonyl group, an indacenyloxycarbonyl group, a fluoranthenyloxycarbonyl group, an acenaphthylenyloxycarbonyl group, an aceanthryleneyloxycarbonyl group, a phenalenyloxycarbonyl group, a fluorenyloxycarbonyl group, an anthryloxycarbonyl group, a bianthracenyloxycarbonyl group, a teranthracenyloxycarbonyl group, a quarter anthracenyloxycarbonyl group, an anthraquinolyloxycarbonyl group, a phenanthryloxycarbonyl group, a triphenylenyloxycarbonyl group, a pyrenyloxycarbonyl group, a chrysenyloxycarbonyl group, a naphthacenyloxycarbonyl group, a preadenyloxycarbonyl group, a picenyloxycarbonyl group, a perylenyloxycarbonyl group, a pentaphenyloxycarbonyl group, a pentacenyloxycarbonyl group, a tetraphenylenyloxycarbonyl group, a hexaphenyloxycarbonyl group, a hexacenyloxycarbonyl group, a rubisenyloxycarbonyl group, and a coronenyloxycarbonyl group. Among these, for example, a phenoxycarbonyl group is preferable.

Examples of the substituent in the aryloxycarbonyl group include an alkyl group, a hydroxy group, and a halogen atom (such as a fluorine atom, a bromine atom, or an iodine atom). Examples of the alkyl group that substitutes a hydrogen atom of the aryloxycarbonyl group include the same groups as the groups for the unsubstituted alkyl group represented by $R^{11}$ to $R^{18}$ in General Formula (1).

Examples of the alkoxycarbonylalkyl group represented by $R^{11}$ to $R^{18}$ ($-(C_nH_{2n})-CO-OR$, R represents an alkyl group, and n represents an integer of 1 or greater) in General Formula (1) include a substituted or unsubstituted alkoxycarbonylalkyl group.

Examples of the alkoxycarbonyl group ($-CO-OR$) in the unsubstituted alkoxycarbonylalkyl group represented by $R^{11}$ to $R^{18}$ in General Formula (1) include the same groups as the groups for the alkoxycarbonyl group represented by $R^{11}$ to $R^{18}$ in General Formula (1).

Examples of the alkylene chain ($-C_nH_{2n}-$) in the unsubstituted alkoxycarbonylalkyl group represented by $R^{11}$ to $R^{18}$ in General Formula (1) include a linear alkylene chain having 1 or more and 20 or less carbon atoms (for example, preferably 1 or more and 10 or less carbon atoms and more preferably 1 or more and 6 or less carbon atoms), a branched alkylene chain having 3 or more and 20 or less carbon atoms (for example, preferably 3 or more and 10 or less carbon atoms), and a cyclic alkylene chain having 3 or more and 20 or less carbon atoms (for example, preferably 3 or more and 10 or less carbon atoms).

Examples of the linear alkylene chain having 1 or more and 20 or less carbon atoms include a methylene group, an ethylene group, an n-propylene group, an n-butylene group, an n-pentylene group, an n-hexylene group, an n-heptylene group, an n-octylene group, an n-nonylene group, an n-decylene group, an n-undecylene group, an n-dodecylene group, a tridecylene group, an n-tetradecylene group, an n-pentadecylene group, an n-heptadecylene group, an n-octadecylene group, an n-nonadecylene group, and an n-icosylene group.

Examples of the branched alkylene chain having 3 or more and 20 or less carbon atoms include an isopropylene group, an isobutylene group, a sec-butylene group, a tert-butylene group, an isopentylene group, a neopentylene group, a tert-pentylene group, an isohexylene group, a sec-hexylene group, a tert-hexylene group, an isoheptylene group, a sec-heptylene group, a tert-heptylene group, an isooctylene group, a sec-octylene group, a tert-octylene group, an isononylene group, a sec-nonylene group, a tert-nonylene group, an isodecylene group, a sec-decylene group, a tert-decylene group, an isododecylene group, a sec-dodecylene group, a tert-dodecylene group, a tert-tetradecylene group, and a tert-pentadecylene group.

Examples of the cyclic alkylene chain having 3 or more and 20 or less carbon atoms include a cyclopropylene group, a cyclobutylene group, a cyclopentylene group, a cyclohexylene group, a cycloheptyrene group, a cyclooctylene group, a cyclononylene group, and a cyclodecylene group.

Examples of the substituent in the alkoxycarbonylalkyl group include an aryl group, a hydroxy group, and a halogen atom (such as a fluorine atom, a bromine atom, or an iodine atom).

Examples of the aryl group that substitutes a hydrogen atom of the alkoxycarbonylalkyl group include the same groups as the groups for the unsubstituted aryl group represented by $R^{11}$ to $R^{18}$ in General Formula (1).

Examples of the aryloxycarbonylalkyl groups represented by $R^{11}$ to $R^{18}$ ($-(C_nH_{2n})-CO-OAr$, Ar represents an aryl group, and n represents an integer of 1 or greater) in General Formula (1) include a substituted or unsubstituted aryloxycarbonylalkyl group.

Examples of the aryloxycarbonyl group ($-CO-OAr$, Ar represents an aryl group) in the unsubstituted aryloxycarbonylalkyl group represented by $R^{11}$ to $R^{18}$ in General Formula (1) include the same groups as the groups for the aryloxycarbonyl group represented by $R^{11}$ to $R^{18}$ in General Formula (1).

Examples of the alkylene chain ($-C_nH_{2n}-$) in the unsubstituted aryloxycarbonylalkyl group represented by $R^{11}$ to $R^{18}$ in General Formula (1) include the same groups as the groups for the alkylene chain in the alkoxycarbonylalkyl group represented by $R^{11}$ to $R^{18}$ in General Formula (1).

Examples of the substituent in the aryloxycarbonylalkyl group include an alkyl group, a hydroxy group, and a halogen atom (such as a fluorine atom, a bromine atom, or an iodine atom).

Examples of the alkyl group that substitutes a hydrogen atom of the aryloxycarbonylalkyl group include the same groups as the groups for the unsubstituted alkyl group represented by $R^{11}$ to $R^{18}$ in General Formula (1).

Examples of the halogen atom represented by $R^{11}$ to $R^{18}$ in General Formula (1) include a fluorine atom, a chlorine atom, a bromine atom, and an iodine atom.

Examples of the ring structure formed by $R^{11}$ and $R^{12}$, $R^{12}$ and $R^{13}$, $R^{13}$ and $R^{14}$, $R^{15}$ and $R^{16}$, $R^{16}$ and $R^{17}$, or $R^{17}$ and $R^{18}$ in General Formula (1) being linked to each other include a benzene ring and a fused ring having 10 or more and 18 or less carbon atoms (such as a naphthalene ring, an anthracene ring, a phenanthrene ring, a chrysene ring (benzo[α]phenanthrene ring), a tetracene ring, a tetraphene ring (benzo[α]anthracene ring), or a triphenylene ring). Among these, for example, a benzene ring is preferable as the ring structure to be formed.

Examples of the alkyl group represented by $R^{21}$ to $R^{28}$ in General Formula (2) include the same groups as the groups for the alkyl group represented by $R^{11}$ to $R^{18}$ in General Formula (1).

Examples of the alkoxy group represented by $R^{21}$ to $R^{28}$ in General Formula (2) include the same groups as the groups for the alkoxy group represented by $R^{11}$ to $R^{18}$ in General Formula (1).

Examples of the aralkyl group represented by $R^{21}$ to $R^{28}$ in General Formula (2) include the same groups as the groups for the aralkyl group represented by $R^{11}$ to $R^{18}$ in General Formula (1).

Examples of the aryl group represented by $R^{21}$ to $R^{28}$ in General Formula (2) include the same groups as the groups for the aryl group represented by $R^{11}$ to $R^{18}$ in General Formula (1).

Examples of the aryloxy group represented by $R^{21}$ to $R^{28}$ in General Formula (2) include the same groups as the groups for the aryloxy group represented by $R^{11}$ to $R^{18}$ in General Formula (1).

Examples of the alkoxycarbonyl group represented by $R^{21}$ to $R^{28}$ in General Formula (2) include the same groups as the groups for the alkoxycarbonyl group represented by $R^{11}$ to $R^{18}$ in General Formula (1).

Examples of the aryloxycarbonyl group represented by $R^{21}$ to $R^{28}$ in General Formula (2) include the same groups as the groups for the aryloxycarbonyl group represented by $R^{11}$ to $R^{18}$ in General Formula (1).

Examples of the alkoxycarbonylalkyl group represented by $R^{21}$ to $R^{28}$ in General Formula (2) include the same groups as the groups for the alkoxycarbonylalkyl group represented by $R^{11}$ to $R^{18}$ in General Formula (1).

Examples of the aryloxycarbonylalkyl group represented by $R^{21}$ to $R^{28}$ in General Formula (2) include the same groups as the groups for the aryloxycarbonylalkyl group represented by $R^{11}$ to $R^{18}$ in General Formula (1).

Examples of the halogen atom represented by $R^{21}$ to $R^{28}$ in General Formula (2) include the same atoms as the atoms for the halogen atom represented by $R^{11}$ to $R^{18}$ in General Formula (1).

Examples of the ring structure formed by $R^{21}$ and $R^{22}$, $R^{22}$ and $R^{23}$, $R^{23}$ and $R^{24}$, $R^{25}$ and $R^{26}$, $R^{26}$ and $R^{27}$, or $R^{27}$ and $R^{28}$ in General Formula (2) being linked to each other include a benzene ring and a fused ring having 10 or more and 18 or less carbon atoms (such as a naphthalene ring, an anthracene ring, a phenanthrene ring, a chrysene ring (benzo[α]phenanthrene ring), a tetracene ring, a tetraphene ring (benzo[α]anthracene ring), or a triphenylene ring). Among these, for example, a benzene ring is preferable as the ring structure to be formed.

It is preferable that $R^{11}$, $R^{12}$, $R^{13}$, $R^{14}$, $R^{15}$, $R^{16}$, $R^{17}$, and $R^{18}$ in General Formula (1) each independently represent, for example, a hydrogen atom, an alkyl group, an alkoxycarbonyl group, an aryloxycarbonyl group, an alkoxycarbonylalkyl group, or an aryloxycarbonylalkyl group.

It is preferable that $R^{21}$, $R^{22}$, $R^{23}$, $R^{24}$, $R^{25}$, $R^{26}$, $R^{27}$, and $R^{28}$ in General Formula (2) each independently represent, for example, a hydrogen atom, an alkyl group, an alkoxycarbonyl group, an aryloxycarbonyl group, an alkoxycarbonylalkyl group, or an aryloxycarbonylalkyl group.

Hereinafter, specific examples of the compound represented by General Formula (1) or General Formula (2) will be described, but the present exemplary embodiment is not limited thereto.

1-1

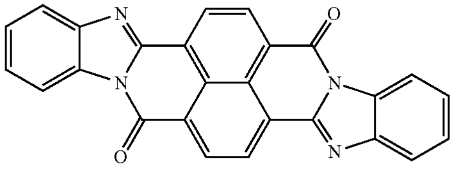

1-2

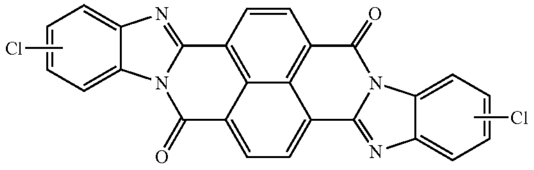

1-3

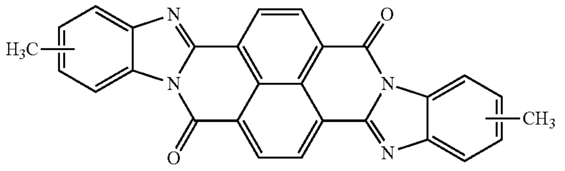

1-4

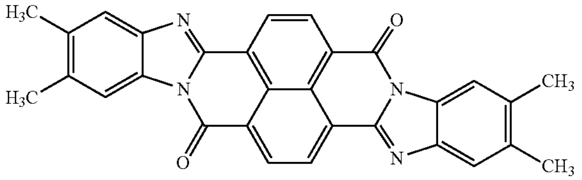

1-5

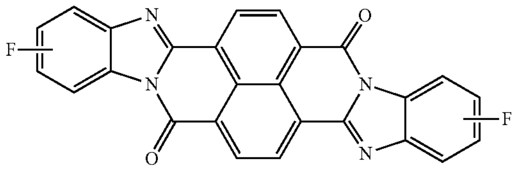

1-6

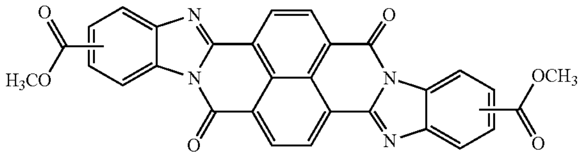

1-7

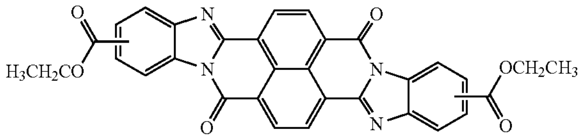

1-8

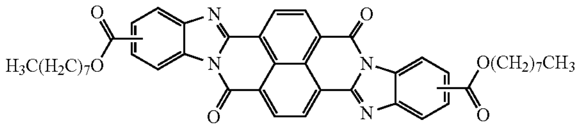

-continued
1-9
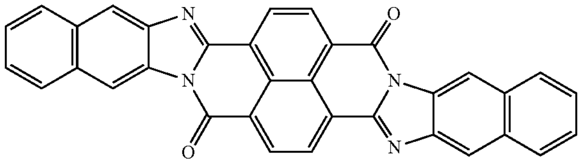
1-10
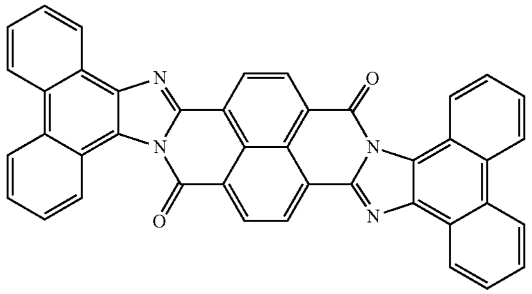
1-11
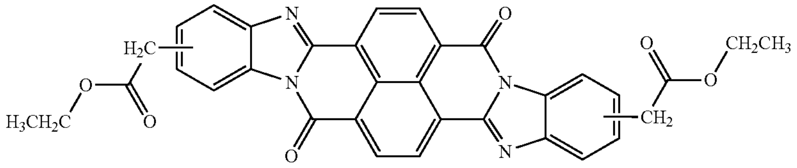
1-12
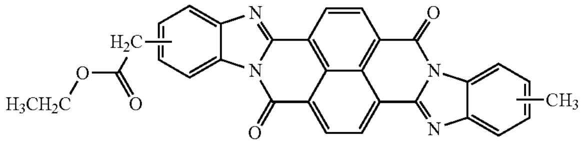
1-13
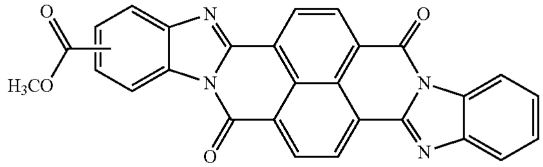
1-14
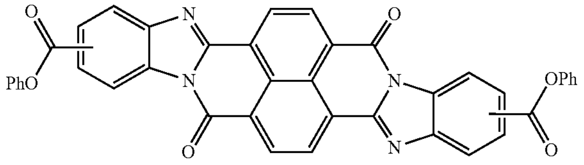
1-15
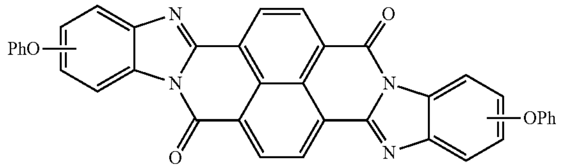
1-16
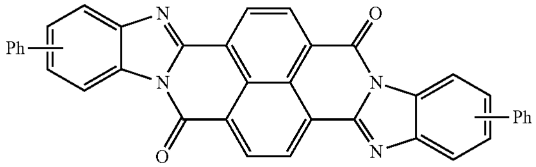
1-17
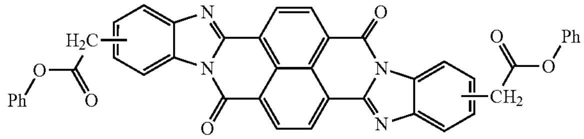
1-18
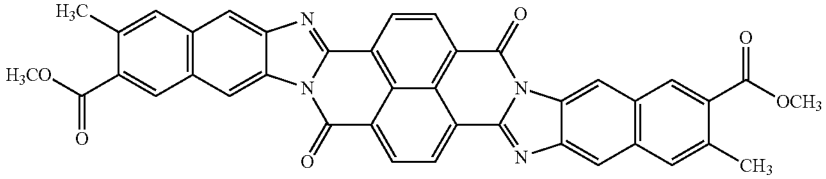
2-1
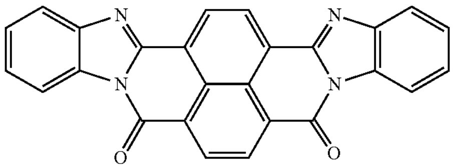
2-2
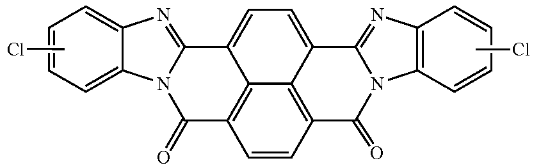

-continued
2-3
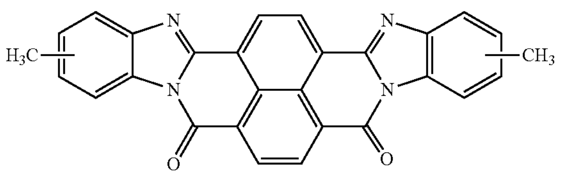
2-4
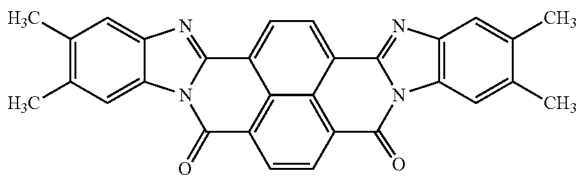
2-5
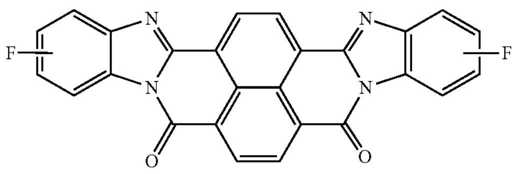
2-6
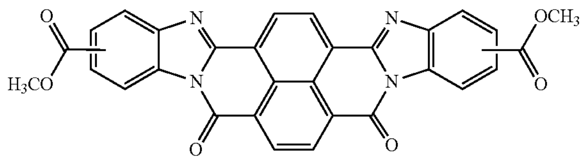
2-7
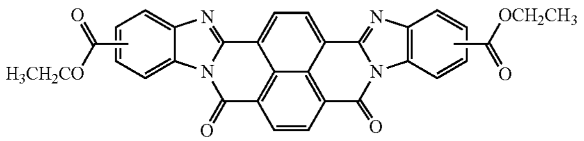
2-8
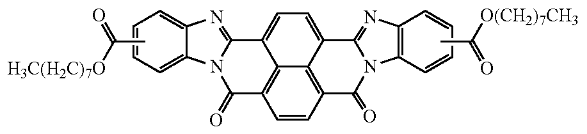
2-9
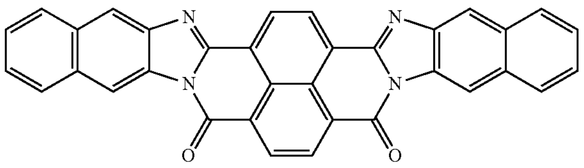
2-10
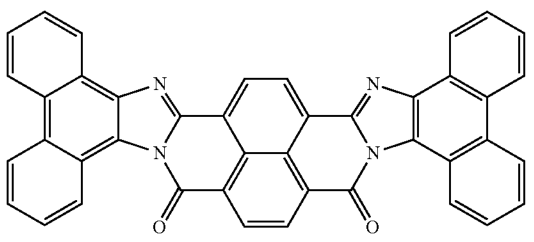
2-11
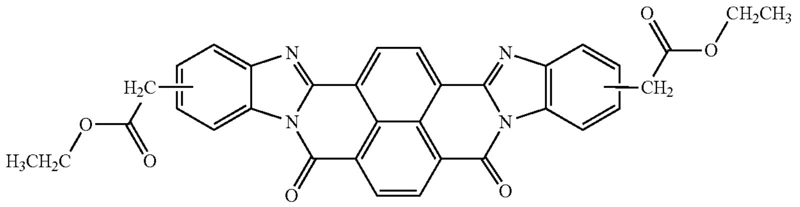
2-12
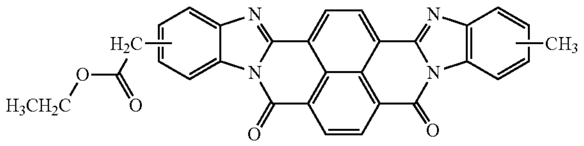
2-13
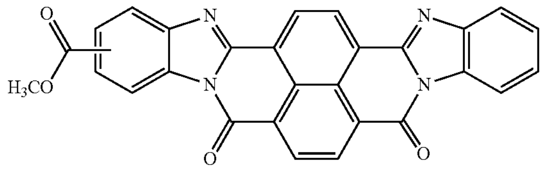
2-14
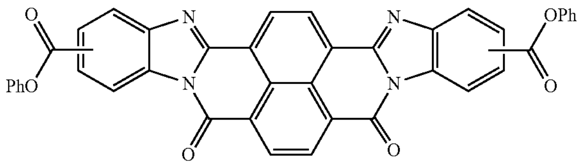
2-15
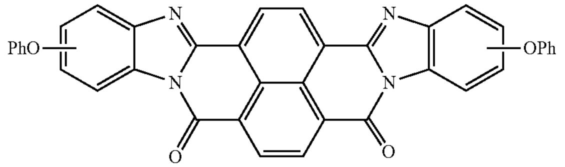
2-16
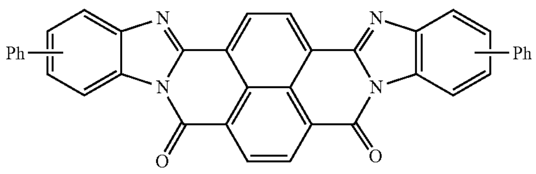
2-17
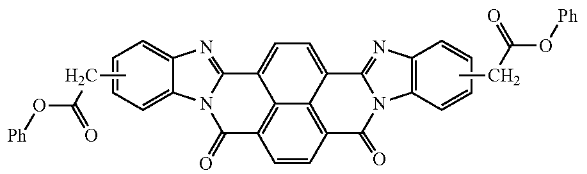

-continued 2-18

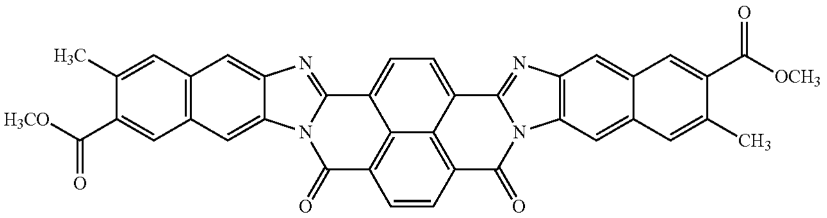

The compound represented by General Formula (1) and the compound represented by General Formula (2) have an isomer relationship (that is, a relationship between a cis form and a trans form). As a typical synthesis method, 2 μmoles of an orthophenylenediamine compound and 1 μmole of a naphthalenetetracarboxylic acid compound are synthesized by being heated and condensed, a mixture of a cis form and a trans form is obtained, and the proportion of the cis form is typically greater than the trans form in the mixing ratio thereof. The soluble cis-form and the sparingly soluble trans-form can be separated by, for example, being heated and washed with potassium hydroxide in an alcohol solution.

Compound Represented by General Formula (3)

Hereinafter, the compound represented by General Formula (3) will be described.

General Formula (3)

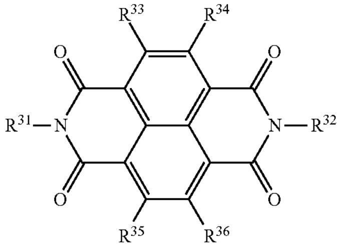

In General Formula (3), $R^{31}$, $R^{32}$, $R^{33}$, $R^{34}$, $R^{35}$, and $R^{36}$ (hereinafter, also simply referred to as "$R^{31}$ to $R^{36}$") each independently represent a hydrogen atom, an alkyl group, an alkoxy group, an aralkyl group, an aryl group, an alkoxycarbonyl group, or a halogen atom.

Examples of the alkyl group, the alkoxy group, the aralkyl group, the aryl group, the alkoxycarbonyl group, and the halogen atom represented by $R^{31}$ to $R^{36}$ in General Formula (3) include the same groups and the same atoms as the groups and the atoms for the alkyl group, the alkoxy group, the aralkyl group, the aryl group, the alkoxycarbonyl group, and the halogen atom represented by $R^{11}$ to $R^{18}$ in General Formula (1).

The alkyl group, the alkoxy group, the aralkyl group, the aryl group, and the alkoxycarbonyl group represented by $R^{31}$ to $R^{36}$ in General Formula (3) may have the same substituents as the substituents for the alkyl group, the alkoxy group, the aralkyl group, the aryl group, and the alkoxycarbonyl group represented by $R^{11}$ to $R^{18}$ in General Formula (1).

Hereinafter, exemplary compounds of the compound represented by General Formula (3) will be shown, but the present exemplary embodiment is not limited thereto. Further, the following exemplary compound numbers will be referred to as exemplary compounds (3-numbers) below. Specifically, for example, an exemplary compound 5 will be referred to as "exemplary compound (3-5)".

| Exemplary compound | $R^{31}$ | $R^{32}$ | $R^{33}$ | $R^{34}$ | $R^{35}$ | $R^{36}$ |
|---|---|---|---|---|---|---|
| 1 | H | H | H | H | H | H |
| 2 | $—CH_3$ | $—CH_3$ | H | H | H | H |
| 3 | —Pr | —Pr | H | H | H | H |
| 4 | $—CH_2COOCH_3$ | $—CH_2COOCH_3$ | H | H | H | H |
| 5 | $-c-C_6H_{11}$ | $-c-C_6H_{11}$ | H | H | H | H |
| 6 | $-c-C_6H_{11}$ | $-c-C_6H_{11}$ | —Br | H | H | —Br |
| 7 | $—C_6H_5$ | $—C_6H_5$ | H | H | H | H |
| 8 | $-p-Cl—C_5H_4$ | $-p-Cl—C_6H_4$ | H | H | H | H |
| 9 | $—CH_2C_6H_5$ | $—CH_2C_6H_5$ | H | H | H | H |
| 10 | $—CH_2CH_2C_6H_5$ | $—CH_2CH_2C_6H_5$ | H | H | H | H |

Further, the abbreviations and the like in the above-described exemplary compounds have the following meanings.

Pr: n-propyl group $c-C_6H_{11}$: cyclohexyl group $C_6H_5$: phenyl group $p-Cl—C_6H_4$: para-chlorophenyl group $CH_2C_6H_5$: benzyl group $CH_2CH_2C_6H_5$: penetyl group Compound Represented by General Formula (4)

Hereinafter, the compound represented by General Formula (4) will be described.

General Formula (4)

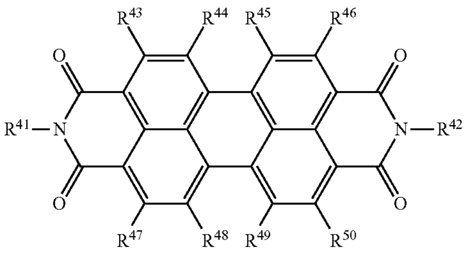

In General Formula (4), $R^{41}$, $R^{42}$, $R^{43}$, $R^{44}$, $R^{45}$, $R^{46}$, $R^{47}$, $R^{48}$, $R^{49}$, and $R^{50}$ (hereinafter, also simply referred to as "$R^{41}$ to $R^{50}$") each independently represent a hydrogen atom, an alkyl group, an alkoxy group, an aralkyl group, an aryl group, an alkoxycarbonyl group, or a halogen atom.

Examples of the alkyl group, the alkoxy group, the aralkyl group, the aryl group, the alkoxycarbonyl group, and the halogen atom represented by $R^{41}$ to $R^{50}$ in General Formula (4) include the same groups and the same atoms as the groups and the atoms for the alkyl group, the alkoxy group, the aralkyl group, the aryl group, the alkoxycarbonyl group, and the halogen atom represented by $R^{11}$ to $R^{18}$ in General Formula (1).

The alkyl group, the alkoxy group, the aralkyl group, the aryl group, and the alkoxycarbonyl group represented by $R^{41}$ to $R^{50}$ in General Formula (4) may have the same substituents as the substituents for the alkyl group, the alkoxy group, the aralkyl group, the aryl group, and the alkoxycarbonyl group represented by $R^{11}$ to $R^{18}$ in General Formula (1).

Hereinafter, exemplary compounds of the compound represented by General Formula (4) will be shown, but the present exemplary embodiment is not limited thereto. Further, the following exemplary compound numbers will be referred to as exemplary compounds (4-numbers) below. Specifically, for example, an exemplary compound 5 will be referred to as "exemplary compound (4-5)".

| Exemplary compound | $R^{41}$ | $R^{42}$ | $R^{43}$ | $R^{44}$ | $R^{45}$ | $R^{46}$ | $R^{47}$ | $R^{48}$ | $R^{49}$ | $R^{50}$ |
|---|---|---|---|---|---|---|---|---|---|---|
| 1 | H | H | H | H | H | H | H | H | H | H |
| 2 | $—CH_3$ | $—CH_3$ | H | H | H | H | H | H | H | H |
| 3 | $—CH_3$ | $—CH_3$ | H | —Cl | —Cl | H | H | —Cl | —Cl | H |
| 4 | -Bu | -Bu | H | F | H | H | H | H | F | H |
| 5 | $-c-C_6H_{11}$ | $-c-C_6H_{11}$ | H | H | H | H | H | H | H | H |
| 6 | $-p-CH_3—C_6H_4$ | $-p-CH_3—C_6H_5$ | H | H | H | H | H | H | H | H |
| 7 | $—C_6H_5$ | $—C_6H_5$ | H | H | H | H | H | H | H | H |
| 8 | $-p-Cl—C_6H_4$ | $-p-Cl—C_6H_4$ | H | H | H | H | H | H | H | H |
| 9 | $-o-Cl—C_6H_4$ | $-o-Cl—C_6H_4$ | H | H | H | H | H | H | H | H |
| 10 | $—CH_2C_6H_5$ | $—CH_2C_6H_5$ | H | H | H | H | H | H | H | H |
| 11 | $-3,5-(CH_3)_2—C_6H_3$ | $-3,5-(CH_3)_2—C_6H_3$ | H | H | H | H | H | H | H | H |
| 12 | $-3,5-Cl_2—C_6H_3$ | $-3,5-Cl_2—C_6H_3$ | H | H | H | H | H | H | H | H |

Further, the abbreviations and the like in the above-described exemplary compounds have the following meanings.

Bu: n-butyl group $c-C_6H_{11}$: cyclohexyl group $p-CH_3—CH_4$ para-tolyl group $C_6H_5$: n-butyl group $p-Cl—C_6H_4$: para-chlorophenyl group O—Cl—C6H4: ortho-chlorophenyl group $CH_2C_6H_5$: benzyl group $3,5-(CH_3)_2—C_6H_3$: 3,5-dimethylphenyl group $3,5-Cl_2—C_6H_3$: 3,5-dichlorophenyl group Compound Represented by General Formula (5)

Hereinafter, the compound represented by General Formula (5) will be described.

General Formula (5)

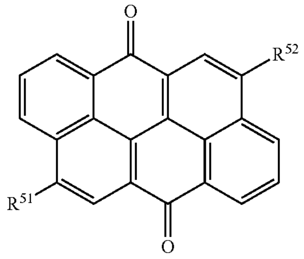

In General Formula (5), $R^{51}$ and $R^{52}$ each independently represent a hydrogen atom, an alkyl group, an alkoxy group, an aralkyl group, an aryl group, an alkoxycarbonyl group, or a halogen atom.

Examples of the alkyl group, the alkoxy group, the aralkyl group, the aryl group, the alkoxycarbonyl group, and the halogen atom represented by $R^{51}$ and $R^{52}$ in General Formula (5) include the same groups and the same atoms as the groups and the atoms for the alkyl group, the alkoxy group, the aralkyl group, the aryl group, the alkoxycarbonyl group, and the halogen atom represented by $R^{11}$ to $R^{18}$ in General Formula (1).

The alkyl group, the alkoxy group, the aralkyl group, the aryl group, and the alkoxycarbonyl group represented by $R^{51}$ and $R^{52}$ in General Formula (5) may have the same substituents as the substituents for the alkyl group, the alkoxy group, the aralkyl group, the aryl group, and the alkoxycarbonyl group represented by $R^{11}$ to $R^{18}$ in General Formula (1).

$R^{51}$ and $R^{52}$ in General Formula (5) may each independently represent a hydrogen atom, an alkyl group having 1 or more and 12 or less carbon atoms, an alkoxy group having 1 or more and 12 or less carbon atoms, a cycloalkyl group, an aryl group, or an aralkyl group.

Hereinafter, exemplary compounds of the compound represented by General Formula (5) will be shown, but the present exemplary embodiment is not limited thereto. Further, the following exemplary compound numbers will be referred to as exemplary compounds (5-numbers) below.

Specifically, for example, an exemplary compound 5 will be referred to as "exemplary compound (5-5)".

| Exemplary compound | $R^{51}$ | $R^{52}$ |
|---|---|---|
| 1 | H | H |
| 2 | $—CH_3$ | $—CH_3$ |
| 3 | $—CH_2CH_3$ | $—CH_2CH_3$ |
| 4 | —Bu | —Bu |
| 5 | $-c-C_6H_{11}$ | $-c-C_6H_{11}$ |
| 6 | $-p-CH_3—C_6H_4$ | $-p-CH_3—C_6H_5$ |
| 7 | $—C_6H_5$ | $—C_6H_5$ |
| 8 | $-p-Cl—C_6H_4$ | $-p-Cl—C_6H_4$ |
| 9 | $-o-Cl—C_6H_4$ | $-o-Cl—C_6H_4$ |
| 10 | $—CH_2C_6H_5$ | $—CH_2C_6H_5$ |
| 11 | $-3,5-(CH_3)_2—C_6H_3$ | $-3,5-(CH_3)_2—C_6H_3$ |
| 12 | $-3,5-Cl_2—C_6H_3$ | $-3,5-Cl_2—C_6H_3$ |
| 13 | Br | Br |
| 14 | Cl | Cl |

Further, the abbreviations and the like in the above-described exemplary compounds have the following meanings.

$t-C_4H_9$: t-butyl group
$OCH_3$: methoxy group
$t-C_4H_9O$: t-butoxy group
$c-C_6H_{11}$: cyclohexyl group
$C_6H_5$: phenyl group
$CH_2C_6H_5$: benzyl group
$3,5-(CH_3)_2—C_6H_3$: 3,5-dimethylphenyl group
$3,5-Cl_2—C_6H_3$: 3,5-dichlorophenyl group
Br: bromine atom
Cl: chlorine atom The content (total content) of the n-type organic pigment of the group consisting of the compounds represented by General Formulae (1) to (5) is, for example, preferably 90% by mass or greater, more preferably 95% by mass or greater, and still more preferably 98% by mass or greater with respect to the total amount of the n-type organic pigment.

The content of the n-type organic pigment is, for example, preferably 50% by mass or greater, more preferably 50% by mass or greater and 80% by mass or less, and still more preferably 55% by mass or greater and 70% by mass or less with respect to the total solid content of the undercoat layer.

Further, in a case where two or more kinds of n-type organic pigments are used in a combination, the content of the n-type organic pigment denotes the total amount of the two or more kinds of n-type organic pigments.

In a case where the content of the n-type organic pigment is 80% by mass or less, degradation of the film quality, a decrease in the film forming properties, and occurrence of surface roughness on the undercoat layer are suppressed, and thus the charge retention properties are more excellent. Meanwhile, in a case where the content of the n-type organic pigment is 50% by mass or greater, occurrence of excess or deficiency in the electron transport ability is suppressed.

It is preferable that the n-type organic pigment is, for example, a purified material.

In a case where the n-type organic pigment is a purified material, the amount of the Fe element in the undercoat layer that is detected by high-frequency inductively coupled plasma emission spectrometric analysis is likely to be adjusted to 80 ppm or less. Therefore, spot-like image defects are more likely to be reduced.

Examples of the purified material include an acid paste-treated material (such as a purified material obtained by adding a solution, formed by dissolving the n-type organic pigment in sulfuric acid once, dropwise to water or an alkaline solvent to precipitate the pigment and washing the pigment), a sublimation purified material, an acid-treated material obtained by acid-treating the n-type organic pigment, which has been subjected to a dry type or wet type pulverization treatment using a ball mill or the like, with an organic acid or an inorganic acid, and a silica gel-treated material obtained by heating and dissolving the n-type organic solvent in a polar solvent such as dimethyl sulfoxide, 1,3-dimethyl-2-imidazolidinone, or n-methyl-2-pyrrolidone and performing a silica gel treatment on the solvent, but the present disclosure is not limited thereto.

Among the examples, for example, at least one of the acid paste-treated purified material or the sublimation purified material is preferable as the purified material. In a case where the n-type organic pigment is soluble in a polar solvent, for example, the silica gel-treated material is also preferable. In a case where the purified material is as described above, the n-type organic pigment is purified with higher purity. As a result, the amount of the Fe element detected by the high-frequency inductively coupled plasma emission spectrometric analysis is considered to be further reduced.

The n-type organic pigment may be controlled to a desired particle size by being pulverized with alumina or zirconium beads as necessary.

Inorganic Particles

The composition may further contain inorganic particles.

Examples of the inorganic particles include inorganic particles having a powder resistance (volume resistivity) of $10^2$ Ωcm or greater and $10^{11}$ Ωcm or less.

Among these, as the inorganic particles having the above-described resistance value, for example, metal oxide particles such as tin oxide particles, titanium oxide particles, zinc oxide particles, and zirconium oxide particles may be used, and zinc oxide particles are particularly preferable.

The specific surface area of the inorganic particles measured by the BET method may be, for example, 10 $\mu m^2/g$ or greater. In a case where the specific surface area thereof is 10 $\mu m^2/g$ or greater, degradation of the charging properties is likely to be suppressed.

The volume average particle diameter of the inorganic particles may be, for example, 50 nm or greater and 2,000 nm or less (for example, preferably 60 nm or greater and 1,000 nm or less).

The content of the inorganic particles is, for example, preferably 0% by mass or greater and 80% by mass or less and more preferably 0% by mass or greater and 70% by mass or less with respect to the total solid content of the undercoat layer.

The inorganic particles may be subjected to a surface treatment. As the inorganic particles, inorganic particles subjected to different surface treatments or inorganic particles having different particle diameters may be used in the form of a mixture of two or more kinds thereof.

Examples of the surface treatment agent include a silane coupling agent, a titanate-based coupling agent, an aluminum-based coupling agent, and a surfactant. In particular, for example, a silane coupling agent is preferable, and a silane coupling agent containing an amino group is more preferable.

Examples of the silane coupling agent containing an amino group include 3-aminopropyltriethoxysilane, N-2-(aminoethyl)-3-aminopropyltrimethoxysilane, N-2-(aminoethyl)-3-aminopropylmethyldimethoxysilane, and N,N-bis(2-hydroxyethyl)-3-aminopropyltriethoxysilane, but are not limited thereto.

The silane coupling agent may be used in the form of a mixture of two or more kinds thereof. For example, a silane coupling agent containing an amino group and another silane coupling agent may be used in combination. Examples of other silane coupling agents include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane, but are not limited thereto.

The surface treatment method using a surface treatment agent may be any method as long as the method is a known method, and any of a dry method or a wet method may be used.

The treatment amount of the surface treatment agent is, for example, preferably 0.5% by mass or greater and 10% by mass or less with respect to the amount of the inorganic particles.

The dry method is, for example, a method of attaching the surface treatment agent to the surface of the inorganic particles by directly adding the surface treatment agent to the inorganic particles or adding the surface treatment agent, which has been dissolved in an organic solvent, dropwise to the inorganic solvent while being stirred with a mixer having a large shearing force and spraying the mixture together with dry air or nitrogen gas. The surface treatment agent may be added dropwise or sprayed, for example, at a temperature lower than or equal to the boiling point of the solvent. After the dropwise addition or the spraying of the surface treatment agent, the surface treatment agent may be further baked at 100° C. or higher. The baking is not particularly limited as long as the temperature and the time are adjusted such that the electrophotographic characteristics can be obtained.

The wet method is, for example, a method of attaching the surface treatment agent to the surface of inorganic particles by adding the surface treatment agent to the inorganic particles while dispersing the inorganic particles in a solvent using a stirrer, ultrasonic waves, a sand mill, an attritor, or a ball mill, stirring or dispersing the mixture, and removing the solvent. The solvent removing method is carried out by, for example, filtration or distillation so that the solvent is distilled off. After removal of the solvent, the mixture may be further baked at 100° C. or higher. The baking is not particularly limited as long as the temperature and the time are adjusted such that the electrophotographic characteristics can be obtained. In the wet method, the moisture contained in the inorganic particles may be removed before the surface treatment agent is added, and examples thereof include a method of removing the moisture while stirring and heating the moisture in a solvent and a method of removing the moisture by azeotropically boiling the moisture with a solvent.

Additives

The undercoat layer may contain various additives for improving the electrical properties, the environmental stability, and the image quality.

Examples of the additives include known materials, for example, an electron-transporting pigment such as a polycyclic condensed pigment or an azo-based pigment, a zirconium chelate compound, a titanium chelate compound, an aluminum chelate compound, a titanium alkoxide compound, an organic titanium compound, and a silane coupling agent. The silane coupling agent is used for a surface treatment of the inorganic particles as described above, but may be further added to the undercoat layer as an additive.

Examples of the silane coupling agent serving as an additive include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compound include zirconium butoxide, ethyl zirconium acetoacetate, zirconium triethanolamine, acetylacetonate zirconium butoxide, ethyl zirconium butoxide acetoacetate, zirconium acetate, zirconium oxalate, zirconium lactate, zirconium phosphonate, zirconium octanoate, zirconium naphthenate, zirconium laurate, zirconium stearate, zirconium isostearate, zirconium butoxide methacrylate, stearate zirconium butoxide, and isostearate zirconium butoxide.

Examples of the titanium chelate compound include tetraisopropyl titanate, tetranormal butyl titanate, a butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanol aminate, and polyhydroxy titanium stearate.

Examples of the aluminum chelate compound include aluminum isopropylate, monobutoxyaluminum diisopropylate, aluminum butyrate, diethylacetoacetate aluminum diisopropylate, and aluminum tris(ethylacetoacetate).

These additives may be used alone or in the form of a mixture or a polycondensate of a plurality of compounds.

Other Properties of Undercoat Layer

The volume resistivity of the undercoat layer is, for example, preferably $1\times10^{10}$ Ωcm or greater and $1\times10^{12}$ Ωcm or less.

The undercoat layer may have, for example, a Vickers hardness of 35 or greater.

The surface roughness (ten-point average roughness) of the undercoat layer may be adjusted, for example, to ½ from 1/(4n) (n represents a refractive index of an upper layer) of a laser wavelength λ for exposure to be used to suppress moire fringes.

Resin particles or the like may be added to the undercoat layer to adjust the surface roughness. Examples of the resin particles include silicone resin particles and crosslinked polymethyl methacrylate resin particles. Further, the surface of the undercoat layer may be polished to adjust the surface roughness. Examples of the polishing method include buff polishing, a sandblast treatment, wet honing, and a grinding treatment.

Method of Forming Undercoat Layer

The formation of the undercoat layer is not particularly limited, and a known forming method is used. For example, a coating film of a coating solution for forming an undercoat layer in which the above-described components are added to a solvent is formed, and the coating film is dried and, as necessary, heated.

Examples of the solvent for preparing the coating solution for forming an undercoat layer include known organic solvents such as an alcohol-based solvent, an aromatic hydrocarbon solvent, a halogenated hydrocarbon solvent, a ketone-based solvent, a ketone alcohol-based solvent, an ether-based solvent, and an ester-based solvent.

Specific examples of these solvents include typical organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method of dispersing the inorganic particles in a case of preparing the coating solution for forming an undercoat layer include known methods such as a roll mill, a ball mill, a vibration ball mill, an attritor, a sand mill, a colloid mill, and a paint shaker.

Since the n-type organic pigments (particularly the compounds represented by General Formulae (1) to (5)) are unlikely to be dissolved in an organic solvent, it is desirable that the n-type organic pigments are, for example, dispersed in an organic solvent. Examples of a dispersing method include known methods such as a roll mill, a ball mill, a vibration ball mill, an attritor, a sand mill, a colloid mill, and a paint shaker. In a case where the metal oxide particles are blended into the undercoat layer, for example, it is desirable that the metal oxide particles are dispersed in an organic solvent by the same dispersing method.

Examples of the method of coating the conductive substrate with the coating solution for forming an undercoat layer include typical coating methods such as a blade coating method, a wire bar coating method, a spray coating method, a dip coating method, a bead coating method, an air knife coating method, and a curtain coating method.

From the viewpoint that the charge retention properties are more excellent, the film thickness of the undercoat layer is, for example, preferably 20 μm or less, more preferably 15 m or less, and still more preferably less than 10 μm.

The film thickness of the undercoat layer may be 10 μm or greater.

Typically in a case where the film thickness of the undercoat layer is 10 μm or greater, since the leakage current in a bulk is more likely to occur and the amount of the charge remaining in the undercoat layer increases, spot-like image defects caused by this factor are more likely to occur. Further, since dark decay is likely to increase, the charge retention properties tend to be degraded. However, in the electrophotographic photoreceptor according to the present exemplary embodiment, the amount of the Fe element in the undercoat layer is 80 ppm or less. Therefore, even in a case where the undercoat layer having a film thickness of 10 μm is used, spot-like image defects are suppressed. In addition, the charge retention properties are also excellent.

Conductive Substrate

Examples of the conductive substrate include metal plates containing metals (such as aluminum, copper, zinc, chromium, nickel, molybdenum, vanadium, indium, gold, and platinum) or alloys (such as stainless steel), metal drums, metal belts, and the like. Further, examples of the conductive substrate include paper, a resin film, a belt, and the like obtained by being coated, vapor-deposited or laminated with a conductive compound (such as a conductive polymer or indium oxide), a metal (such as aluminum, palladium, or gold) or an alloy. Here, the term "conductive" denotes that the volume resistivity is less than $10^{13}$ Ωcm.

In a case where the electrophotographic photoreceptor is used in a laser printer, for example, it is preferable that the surface of the conductive substrate is roughened such that a centerline average roughness Ra thereof is 0.04 μm or greater and 0.5 μm or less for the purpose of suppressing interference fringes from occurring in a case of irradiation with laser beams. In a case where incoherent light is used as a light source, roughening of the surface to prevent interference fringes is not particularly necessary, and it is appropriate for longer life because occurrence of defects due to the unevenness of the surface of the conductive substrate is suppressed.

Examples of the roughening method include wet honing performed by suspending an abrasive in water and spraying the suspension to the conductive substrate, centerless grinding performed by pressure-welding the conductive substrate against a rotating grindstone and continuously grinding the conductive substrate, and an anodizing treatment.

Examples of the roughening method also include a method of dispersing conductive or semi-conductive powder in a resin without roughening the surface of the conductive substrate to form a layer on the surface of the conductive substrate, and performing roughening using the particles dispersed in the layer.

The roughening treatment performed by anodization is a treatment of forming an oxide film on the surface of the conductive substrate by carrying out anodization in an electrolytic solution using a conductive substrate made of a metal (for example, aluminum) as an anode. Examples of the electrolytic solution include a sulfuric acid solution and an oxalic acid solution. However, a porous anodized film formed by anodization is chemically active in a natural state, is easily contaminated, and has a large resistance fluctuation depending on the environment. Therefore, for example, it is preferable that a sealing treatment is performed on the porous anodized film so that the micropores of the oxide film are closed by volume expansion due to a hydration reaction in pressurized steam or boiling water (a metal salt such as nickel may be added thereto) for a change into a more stable a hydrous oxide.

The film thickness of the anodized film is, for example, preferably 0.3 μm or greater and 15 μm or less. In a case where the film thickness is in the above-described range, the barrier properties against injection tend to be exhibited, and an increase in the residual potential due to repeated use tends to be suppressed.

The conductive substrate may be subjected to a treatment with an acidic treatment liquid or a boehmite treatment.

The treatment with an acidic treatment liquid is carried out, for example, as follows. First, an acidic treatment liquid containing phosphoric acid, chromic acid, and hydrofluoric acid is prepared. In the blending ratio of phosphoric acid, chromic acid, and hydrofluoric acid to the acidic treatment liquid, for example, the concentration of the phosphoric acid is 10% by mass or greater and 11% by mass or less, the concentration of the chromic acid is 3% by mass or greater and 5% by mass or less, and the concentration of the hydrofluoric acid is 0.5% by mass or greater and 2% by mass or less, and the concentration of all these acids may be 13.5% by mass or greater and 18% by mass or less. The treatment temperature is, for example, preferably 42° C. or higher and 48° C. or lower. The film thickness of the coating film is, for example, preferably 0.3 μm or greater and 15 μm or less.

The boehmite treatment is carried out, for example, by immersing the conductive substrate in pure water at 90° C. or higher and 100° C. or lower for 5 μminutes to 60 μminutes or by bringing the conductive substrate into contact with heated steam at 90° C. or higher and 120° C. or lower for 5 μminutes to 60 μminutes. The film thickness of the coating film is, for example, preferably 0.1 μm or greater and 5 μm or less. This coating film may be further subjected to the anodizing treatment using an electrolytic solution having low film solubility, such as adipic acid, boric acid, a borate, a phosphate, a phthalate, a maleate, a benzoate, a tartrate, or a citrate.

Interlayer

Although not shown in the figures, an interlayer may be further provided between the undercoat layer and the photosensitive layer.

The interlayer is, for example, a layer containing a resin. Examples of the resin used for the interlayer include a polymer compound, for example, an acetal resin (such as polyvinyl butyral), a polyvinyl alcohol resin, a polyvinyl acetal resin, a casein resin, a polyamide resin, a cellulose resin, gelatin, a polyurethane resin, a polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a phenol-formaldehyde resin, or a melamine resin.

The interlayer may be a layer containing an organometallic compound. Examples of the organometallic compound used for the interlayer include an organometallic compound containing metal atoms such as zirconium, titanium, aluminum, manganese, and silicon.

The compounds used for the interlayer may be used alone or in the form of a mixture or a polycondensate of a plurality of compounds.

Among these, it is preferable that the interlayer is, for example, a layer containing an organometallic compound having a zirconium atom or a silicon atom.

The formation of the interlayer is not particularly limited, and a known forming method is used. For example, a coating film of a coating solution for forming an interlayer in which the above-described components are added to a solvent is formed, and the coating film is dried and, as necessary, heated.

Examples of the coating method of forming the interlayer include typical coating methods such as a dip coating method, a push-up coating method, a wire bar coating method, a spray coating method, a blade coating method, a knife coating method, and a curtain coating method.

The film thickness of the interlayer is set to be, for example, preferably in a range of 0.1 μm or greater and 3 μm or less. Further, the interlayer may be used as the undercoat layer.

Charge Generation Layer

The charge generation layer is, for example, a layer containing a charge generation material and a binder resin. Further, the charge generation layer may be a deposition layer of the charge generation material. The deposition layer of the charge generation material is preferable in a case where an incoherent light source such as a light emitting diode (LED) or an organic electro-luminescence (EL) image array is used.

Examples of the charge generation material include an azo pigment such as bisazo or trisazo; a fused ring aromatic pigment such as dibromoanthanthrone; a perylene pigment; a pyrrolopyrrole pigment; a phthalocyanine pigment; zinc oxide; and trigonal selenium.

Among these, for example, a metal phthalocyanine pigment or a metal-free phthalocyanine pigment is preferably used as the charge generation material in order to deal with laser exposure in a near infrared region. Specifically, for example, hydroxygallium phthalocyanine, chlorogallium phthalocyanine, dichloro-tin phthalocyanine, and titanyl phthalocyanine are more preferable.

On the other hand, for example, a fused ring aromatic pigment such as dibromoanthanthrone, a thioindigo-based pigment, a porphyrazine compound, zinc oxide, trigonal selenium, or a bisazo pigment is preferable as the charge generation material in order to deal with laser exposure in a near ultraviolet region.

The above-described charge generation material may also be used even in a case where an incoherent light source such as an LED or an organic EL image array having a center wavelength of light emission at 450 nm or greater and 780 nm or less is used, but from the viewpoint of the resolution, the field intensity in the photosensitive layer is increased, and a decrease in charge due to injection of a charge from the substrate, that is, image defects referred to as so-called black spots are likely to occur in a case where a thin film having a thickness of m or less is used as the photosensitive layer. The above-described tendency is evident in a case where a p-type semiconductor such as trigonal selenium or a phthalocyanine pigment is used as the charge generation material that is likely to generate a dark current.

On the other hand, in a case where an n-type semiconductor such as a fused ring aromatic pigment, a perylene pigment, or an azo pigment is used as the charge generation material, a dark current is unlikely to be generated, and image defects referred to as black spots can be suppressed even in a case where a thin film is used as the photosensitive layer.

Further, the n-type is determined by the polarity of the flowing photocurrent using a typically used time-of-flight method, and a material in which electrons more easily flow as carriers than positive holes is determined as the n-type.

The binder resin used for the charge generation layer is selected from a wide range of insulating resins, and the binder resin may be selected from organic photoconductive polymers such as poly-N-vinylcarbazole, polyvinylanthracene, polyvinylpyrene, and polysilane.

Examples of the binder resin include a polyvinyl butyral resin, a polyarylate resin (a polycondensate of bisphenols and aromatic divalent carboxylic acid), a polycarbonate resin, a polyester resin, a phenoxy resin, a vinyl chloride-vinyl acetate copolymer, a polyamide resin, an acrylic resin, a polyacrylamide resin, a polyvinylpyridine resin, a cellulose resin, a urethane resin, an epoxy resin, casein, a polyvinyl alcohol resin, and a polyvinylpyrrolidone resin. Here, the term "insulating" denotes that the volume resistivity is $10^{13}$ Ωcm or greater.

These binder resins may be used alone or in the form of a mixture of two or more kinds thereof.

Further, the blending ratio between the charge generation material and the binder resin is, for example, preferably in a range of 10:1 to 1:10 in terms of the mass ratio.

The charge generation layer may also contain other known additives.

The formation of the charge generation layer is not particularly limited, and a known forming method is used. For example, a coating film of a coating solution for forming a charge generation layer in which the above-described components are added to a solvent is formed, and the coating film is dried and, as necessary, heated. Further, the charge generation layer may be formed by vapor deposition of the charge generation material. The formation of the charge generation layer by vapor deposition is, for example, particularly appropriate in a case where a fused ring aromatic pigment or a perylene pigment is used as the charge generation material.

Examples of the solvent for preparing the coating solution for forming a charge generation layer include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents are used alone or in the form of a mixture of two or more kinds thereof.

As a method of dispersing particles (for example, the charge generation material) in the coating solution for forming a charge generation layer, for example, a media disperser such as a ball mill, a vibration ball mill, an attritor, a sand mill, or a horizontal sand mill, or a medialess disperser such as a stirrer, an ultrasonic disperser, a roll mill, or a high-pressure homogenizer is used. Examples of the high-pressure homogenizer include a collision type homogenizer in which a dispersion liquid is dispersed by a liquid-liquid collision or a liquid-wall collision in a high-pressure state, and a penetration type homogenizer in which a dispersion liquid is dispersed by penetrating the liquid through a micro flow path in a high-pressure state.

In addition, during the dispersion, it is effective to set the average particle diameter of the charge generation material in the coating solution for forming a charge generation layer to 0.5 μm or less, for example, preferably 0.3 μm or less, and more preferably 0.15 μm or less.

Examples of the method of coating the undercoat layer (or the interlayer) with the coating solution for forming a charge generation layer include typical methods such as a blade coating method, a wire bar coating method, a spray coating method, a dip coating method, a bead coating method, an air knife coating method, and a curtain coating method.

The film thickness of the charge generation layer is set to, for example, preferably 0.1 μm or greater and 5.0 μm or less and more preferably 0.2 μm or greater and 2.0 μm or less.

Charge Transport Layer

The charge transport layer is, for example, a layer containing a charge transport material and a binder resin. The charge transport layer may be a layer containing a polymer charge transport material.

Examples of the charge transport material include a quinone-based compound such as p-benzoquinone, chloranil, bromanil, or anthraquinone; a tetracyanoquinodimethane-based compound; a fluorenone compound such as 2,4,7-trinitrofluorenone; a xanthone compound; a benzophenone-based compound; a cyanovinyl-based compound; and an electron-transporting compound such as an ethylene-based compound. Examples of the charge transport material include a positive hole-transporting compound such as a triarylamine-based compound, a benzidine-based compound, an arylalkane-based compound, an aryl-substituted ethylene-based compound, a stilbene-based compound, an anthracene-based compound, or a hydrazone-based compound. These charge transport materials may be used alone or in combination of two or more kinds thereof, but are not limited thereto.

From the viewpoint of the charge mobility, for example, a triarylamine derivative represented by Structural Formula (a-1) or a benzidine derivative represented by Structural Formula (a-2) is preferable as the charge transport material.

(a-1)

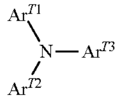

In Structural Formula (a-1), $Ar^{T1}$, $Ar^{T2}$, and $Ar^{T3}$ each independently represent a substituted or unsubstituted aryl group, $—C_6H_4—C(R^{T4})═C(R^{T5})(R^{T6})$, or $—C_6H_4—CH═CH—CH═C(R^{T7})(R^{T8})$. $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group.

Examples of the substituent of each group described above include a halogen atom, an alkyl group having 1 or more and 5 or less carbon atoms, and an alkoxy group having 1 or more and 5 or less carbon atoms. Further, examples of the substituent of each group described above include a substituted amino group substituted with an alkyl group having 1 or more and 3 or less carbon atoms.

(a-2)

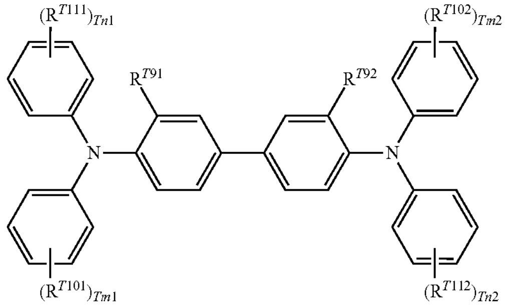

In Structural Formula (a-2), $R^{T91}$ and $R^{T92}$ each independently represent a hydrogen atom, a halogen atom, an alkyl group having 1 or more and 5 or less carbon atoms, or an alkoxy group having 1 or more and 5 or less carbon atoms. $R^{T101}$, $R^{T102}$, $R^{T111}$, and $R^{T112}$ each independently represent a halogen atom, an alkyl group having 1 or more and 5 or less carbon atoms, an alkoxy group having 1 or more and 5 or less carbon atoms, a substituted amino group substituted with an alkyl group having 1 or more and 2 or less carbon atoms, a substituted or unsubstituted aryl group, $—C(R^{T12})═C(R^{T13})(R^{T14})$, or $—CH═CH—CH═C(R^{T15})(R^{T16})$, and $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group. Tm1, Tm2, Tn1, and Tn2 each independently represent an integer of 0 or greater and 2 or less.

Examples of the substituent of each group described above include a halogen atom, an alkyl group having 1 or more and 5 or less carbon atoms, and an alkoxy group having 1 or more and 5 or less carbon atoms. Further, examples of the substituent of each group described above include a substituted amino group substituted with an alkyl group having 1 or more and 3 or less carbon atoms.

Here, among the triarylamine derivative represented by Structural Formula (a-1) and the benzidine derivative represented by Structural Formula (a-2), for example, a triarylamine derivative having "$—C_6H_4—CH═CH—CH═C(R^{T7})(R^{T8})$" and a benzidine derivative having "$—CH═CH—CH═C(R^{T15})(R^{T16})$" are particularly preferable from the viewpoint of the charge mobility.

As the polymer charge transport material, known materials having charge transport properties, such as poly-N-vinylcarbazole and polysilane, can be used. Particularly, for example, a polyester-based polymer charge transport material is particularly preferable. In addition, the polymer charge transport material may be used alone or in combination with a binder resin.

Examples of the binder resin used for the charge transport layer include a polycarbonate resin, a polyester resin, a polyarylate resin, a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone alkyd resin, a phenol-formaldehyde resin, a styrene-alkyd resin, poly-N-vinylcarbazole, and polysilane. Among these, for example, a polycarbonate resin or a polyarylate resin is preferable as the binder resin. These binder resins may be used alone or in combination of two or more kinds thereof.

Further, the blending ratio between the charge transport material and the binder resin is, for example, preferably in a range of 10:1 to 1:5 in terms of the mass ratio.

The charge transport layer may also contain other known additives.

The formation of the charge transport layer is not particularly limited, and a known forming method is used. For example, a coating film of a coating solution for forming a charge transport layer in which the above-described components are added to a solvent is formed, and the coating film is dried and, as necessary, heated.

Examples of the solvent for preparing the coating solution for forming a charge transport layer include typical organic solvents, for example, aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. These solvents are used alone or in the form of a mixture of two or more kinds thereof.

Examples of the coating method of coating the charge generation layer with the coating solution for forming a charge transport layer include typical methods such as a blade coating method, a wire bar coating method, a spray coating method, a dip coating method, a bead coating method, an air knife coating method, and a curtain coating method.

The film thickness of the charge transport layer is set to, for example, preferably 5 μm or greater and 50 μm or less and more preferably 10 μm or greater and 30 μm or less.

Protective Layer

A protective layer is provided on the photosensitive layer as necessary. The protective layer is provided, for example, for the purpose of preventing a chemical change in the photosensitive layer during charging and further improving the mechanical strength of the photosensitive layer.

Therefore, for example, a layer formed of a cured film (crosslinked film) may be applied to the protective layer. Examples of these layers include the layers described in the items 1) and 2) below.

1) A layer formed of a cured film of a composition containing a reactive group-containing charge transport material having a reactive group and a charge-transporting skeleton in an identical molecule (that is, a layer containing a polymer or a crosslinked body of the reactive group-containing charge transport material)

2) A layer formed of a cured film of a composition containing a non-reactive charge transport material and a reactive group-containing non-charge transport material containing a reactive group without having a charge-transporting skeleton (that is, a layer containing the non-reactive charge transport material and a polymer or crosslinked body of the reactive group-containing non-charge transport material)

Examples of the reactive group of the reactive group-containing charge transport material include known reactive groups such as a chain polymerizable group, an epoxy group, —OH, —OR [here, R represents an alkyl group], $—NH_2$, —SH, —COOH, and $—SiR^{Q1}_{3-Qn}(OR^{Q2})_{Qn}$[here, $R^{Q1}$ represents a hydrogen atom, an alkyl group, or a substituted or unsubstituted aryl group, $R^{Q2}$ represents a hydrogen atom, an alkyl group, or a trialkylsilyl group, and Qn represents an integer of 1 to 3].

The chain polymerizable group is not particularly limited as long as the group is a functional group capable of radical polymerization and is, for example, a functional group containing a group having at least a carbon double bond. Specific examples thereof include a vinyl group, a vinyl ether group, a vinyl thioether group, a styryl group (vinylphenyl group), an acryloyl group, a methacryloyl group, and a group containing at least one selected from derivatives thereof. Among these, from the viewpoint that the reactivity is excellent, for example, a vinyl group, a styrene group (vinylphenyl group), an acryloyl group, a methacryloyl group, and a group containing at least one selected from derivatives thereof are preferable as the chain polymerizable group.

The charge-transporting skeleton of the reactive group-containing charge transport material is not particularly limited as long as the skeleton is a known structure in the electrophotographic photoreceptor, and examples thereof include a structure conjugated with a nitrogen atom, which is a skeleton derived from a nitrogen-containing positive hole-transporting compound such as a triarylamine-based compound, a benzidine-based compound, or a hydrazone-based compound. Among these, for example, a triarylamine skeleton is preferable.

The reactive group-containing charge transport material having the reactive group and the charge-transporting skeleton, the non-reactive charge transport material, and the reactive group-containing non-charge transport material may be selected from known materials.

The protective layer may also contain other known additives.

The formation of the protective layer is not particularly limited, and a known forming method is used. For example, a coating film of a coating solution for forming a protective layer in which the above-described components are added to a solvent is formed, and the coating film is dried and, as necessary, subjected to a curing treatment such as heating.

Examples of the solvent for preparing the coating solution for forming a protective layer include an aromatic solvent such as toluene or xylene; a ketone-based solvent such as methyl ethyl ketone, methyl isobutyl ketone, or cyclohexanone; an ester-based solvent such as ethyl acetate or butyl acetate; an ether-based solvent such as tetrahydrofuran or dioxane; a cellosolve-based solvent such as ethylene glycol monomethyl ether; and an alcohol-based solvent such as isopropyl alcohol or butanol. These solvents are used alone or in the form of a mixture of two or more kinds thereof.

In addition, the coating solution for forming a protective layer may be a solvent-less coating solution.

Examples of the method of coating the photosensitive layer (such as the charge transport layer) with the coating solution for forming a protective layer include typical coating methods such as a dip coating method, a push-up coating method, a wire bar coating method, a spray coating method, a blade coating method, a knife coating method, and a curtain coating method.

The film thickness of the protective layer is set to, for example, preferably 1 μm or greater and 20 μm or less and more preferably 2 μm or greater and 10 μm or less.

Single Layer Type Photosensitive Layer

The single layer type photosensitive layer (charge generation/charge transport layer) is a layer containing a charge generation material, a charge transport material, a binder resin, and as necessary, other known additives. Further, these materials are the same as the materials described in the sections of the charge generation layer and the charge transport layer.

Further, the content of the charge generation material in the single layer type photosensitive layer may be, for example, 0.1% by mass or greater and 10% by mass or less and preferably 0.8% by mass or greater and 5% by mass or less with respect to the total solid content.

Further, the content of the charge transport material in the single layer type photosensitive layer may be, for example, 5% by mass or greater and 50% by mass or less with respect to the total solid content.

The method of forming the single layer type photosensitive layer is the same as the method of forming the charge generation layer or the charge transport layer.

The film thickness of the single layer type photosensitive layer may be, for example, 5 m or greater and 50 μm or less and preferably 10 μm or greater and 40 μm or less.

Image Forming Apparatus and Process Cartridge

An image forming apparatus according to the present exemplary embodiment includes the electrophotographic photoreceptor, a charging device that charges a surface of the electrophotographic photoreceptor, an electrostatic latent image forming device that forms an electrostatic latent image on the charged surface of the electrophotographic photoreceptor, a developing device that develops the electrostatic latent image formed on the surface of the electrophotographic photoreceptor with a developer containing a toner to form a toner image, and a transfer device that transfers the toner image to a surface of a recording medium. Further, the electrophotographic photoreceptor according to the present exemplary embodiment is employed as the electrophotographic photoreceptor.

As the image forming apparatus according to the present exemplary embodiment, known image forming apparatuses such as an apparatus including a fixing device that fixes a toner image transferred to the surface of a recording medium; a direct transfer type apparatus that transfers a toner image formed on the surface of an electrophotographic photoreceptor directly to a recording medium; an intermediate transfer type apparatus that primarily transfers a toner image formed on the surface of an electrophotographic photoreceptor to the surface of an intermediate transfer member and secondarily transfers the toner image transferred to the surface of the intermediate transfer member to the surface of a recording medium; an apparatus including a cleaning device that cleans the surface of an electrophotographic photoreceptor after the transfer of a toner image and before the charging; an apparatus including a destaticizing device that destaticizes the surface of an electrophotographic photoreceptor by irradiating the surface with destaticizing light after the transfer of a toner image and before the charging; and an apparatus including an electrophotographic photoreceptor heating member for increasing the temperature of an electrophotographic photoreceptor and decreasing the relative temperature are employed.

In a case of the intermediate transfer type device, the transfer device is, for example, configured to include an intermediate transfer member having a surface onto which the toner image is transferred, a primary transfer device primarily transferring the toner image formed on the surface of the electrophotographic photoreceptor to the surface of the intermediate transfer member, and a secondary transfer device secondarily transferring the toner image transferred to the surface of the intermediate transfer member to the surface of the recording medium.

The image forming apparatus according to the present exemplary embodiment may be any of a dry development type image forming apparatus or a wet development type (development type using a liquid developer) image forming apparatus.

Further, in the image forming apparatus according to the present exemplary embodiment, for example, the portion including the electrophotographic photoreceptor may have a cartridge structure (process cartridge) that is attachable to and detachable from the image forming apparatus. As the process cartridge, for example, a process cartridge including the electrophotographic photoreceptor according to the present exemplary embodiment is preferably used. Further, the process cartridge may include, for example, at least one selected from the group consisting of a charging device, an electrostatic latent image forming device, a developing device, and a transfer device in addition to the electrophotographic photoreceptor.

Hereinafter, an example of the image forming apparatus according to the present exemplary embodiment will be described, but the present exemplary embodiment is not limited thereto. Further, main parts shown in the figures will be described, but description of other parts will not be provided.

Figure 2:
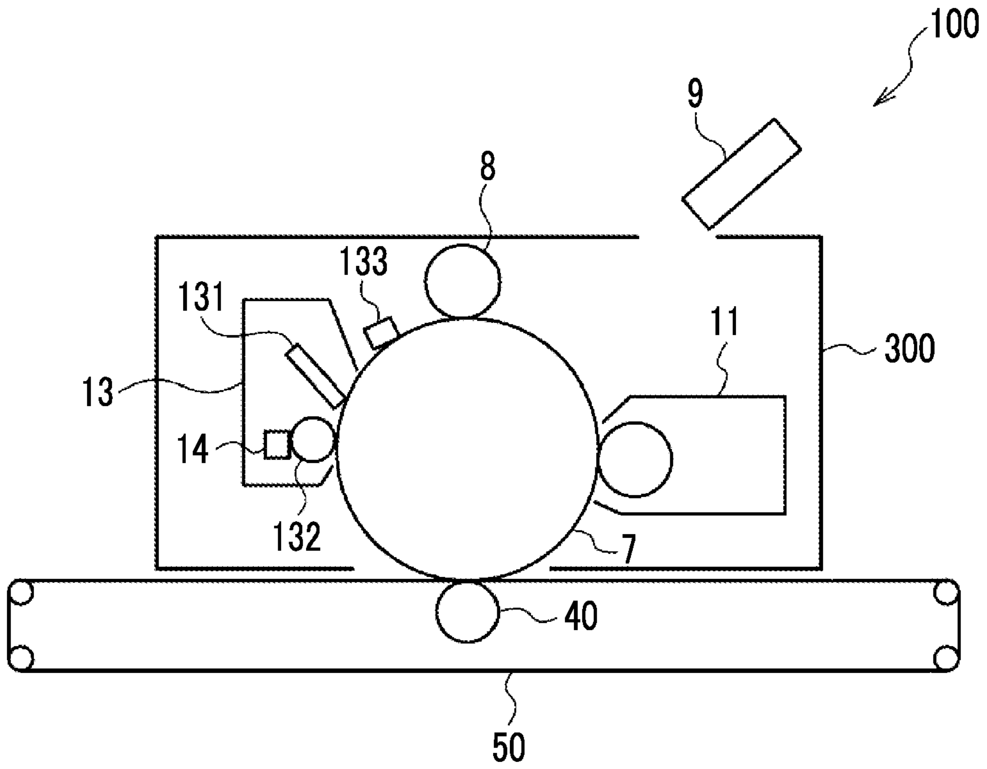
FIG. 2 is a schematic configuration view showing an example of an image forming apparatus according to the present exemplary embodiment.

FIG. 2 is a schematic configuration view showing an example of the image forming apparatus according to the present exemplary embodiment.

As shown in FIG. 2, an image forming apparatus 100 according to the present exemplary embodiment includes a process cartridge 300 including an electrophotographic photoreceptor 7, an exposure device 9 (an example of an electrostatic latent image forming device), a transfer device 40 (primary transfer device), and an intermediate transfer member 50. Further, in the image forming apparatus 100, the exposure device 9 is disposed at a position that can be exposed to the electrophotographic photoreceptor 7 from an opening portion of the process cartridge 300, the transfer device 40 is disposed at a position that faces the electrophotographic photoreceptor 7 via the intermediate transfer member 50, and the intermediate transfer member 50 is disposed such that a part of the intermediate transfer member 50 is in contact with the electrophotographic photoreceptor 7. Although not shown, the image forming apparatus also includes a secondary transfer device that transfers the toner image transferred to the intermediate transfer member 50 to a recording medium (for example, paper). Further, the intermediate transfer member 50, the transfer device 40 (primary transfer device), and the secondary transfer device (not shown) correspond to an example of the transfer device.

The process cartridge 300 in FIG. 2 integrally supports the electrophotographic photoreceptor 7, a charging device 8 (an example of the charging device), a developing device 11 (an example of the developing device), and a cleaning device 13 (an example of the cleaning device) in a housing. The cleaning device 13 has a cleaning blade (an example of the cleaning member) 131, and the cleaning blade 131 is disposed to come into contact with the surface of the electrophotographic photoreceptor 7. Further, the cleaning member may be a conductive or insulating fibrous member instead of the aspect of the cleaning blade 131, and may be used alone or in combination with the cleaning blade 131.

Further, FIG. 2 shows an example of an image forming apparatus including a fibrous member 132 (roll shape) that supplies a lubricant 14 to the surface of the electrophotographic photoreceptor 7 and a fibrous member 133 (flat brush shape) that assists cleaning, but these are disposed as necessary.

Hereinafter, each configuration of the image forming apparatus according to the present exemplary embodiment will be described.

Charging Device

As the charging device 8, for example, a contact-type charger formed of a conductive or semi-conductive charging roller, a charging brush, a charging film, a charging rubber blade, a charging tube, or the like is used. Further, a known charger such as a non-contact type roller charger, or a scorotron charger or a corotron charger using corona discharge is also used.

Exposure Device

Examples of the exposure device 9 include an optical system device that exposes the surface of the electrophotographic photoreceptor 7 to light such as a semiconductor laser beam, LED light, and liquid crystal shutter light in a predetermined image pattern. The wavelength of the light source is within the spectral sensitivity region of the electrophotographic photoreceptor. As the wavelength of a semiconductor laser, near infrared, which has an oscillation wavelength in the vicinity of 780 nm, is mostly used. However, the wavelength is not limited thereto, and a laser having an oscillation wavelength of approximately 600 nm level or a laser having an oscillation wavelength of 400 nm or greater and 450 nm or less as a blue laser may also be used. Further, a surface emission type laser light source capable of outputting a multi-beam is also effective for forming a color image.

Developing Device

Examples of the developing device 11 include a typical developing device that performs development in contact or non-contact with the developer. The developing device 11 is not particularly limited as long as the developing device has the above-described functions, and is selected depending on the purpose thereof. Examples of the developing device include known developing machines having a function of attaching a one-component developer or a two-component developer to the electrophotographic photoreceptor 7 using a brush, a roller, or the like. Among these, for example, a developing device formed of a developing roller having a surface on which a developer is held is preferably used.

The developer used in the developing device 11 may be a one-component developer containing only a toner or a two-component developer containing a toner and a carrier. Further, the developer may be magnetic or non-magnetic. Known developers are employed as these developers.

Cleaning Device

As the cleaning device 13, a cleaning blade type device including the cleaning blade 131 is used.

Further, in addition to the cleaning blade type device, a fur brush cleaning type device or a simultaneous development cleaning type device may be employed.

Transfer Device

Examples of the transfer device 40 include a known transfer charger such as a contact-type transfer charger using a belt, a roller, a film, a rubber blade, or the like, or a scorotron transfer charger or a corotron charger using corona discharge.

Intermediate Transfer Member

As the intermediate transfer member 50, a belt-like intermediate transfer member (intermediate transfer belt) containing semi-conductive polyimide, polyamide-imide, polycarbonate, polyarylate, polyester, rubber, or the like is used. Further, as the form of the intermediate transfer member, a drum-like intermediate transfer member may be used in addition to the belt-like intermediate transfer member.

Figure 3:
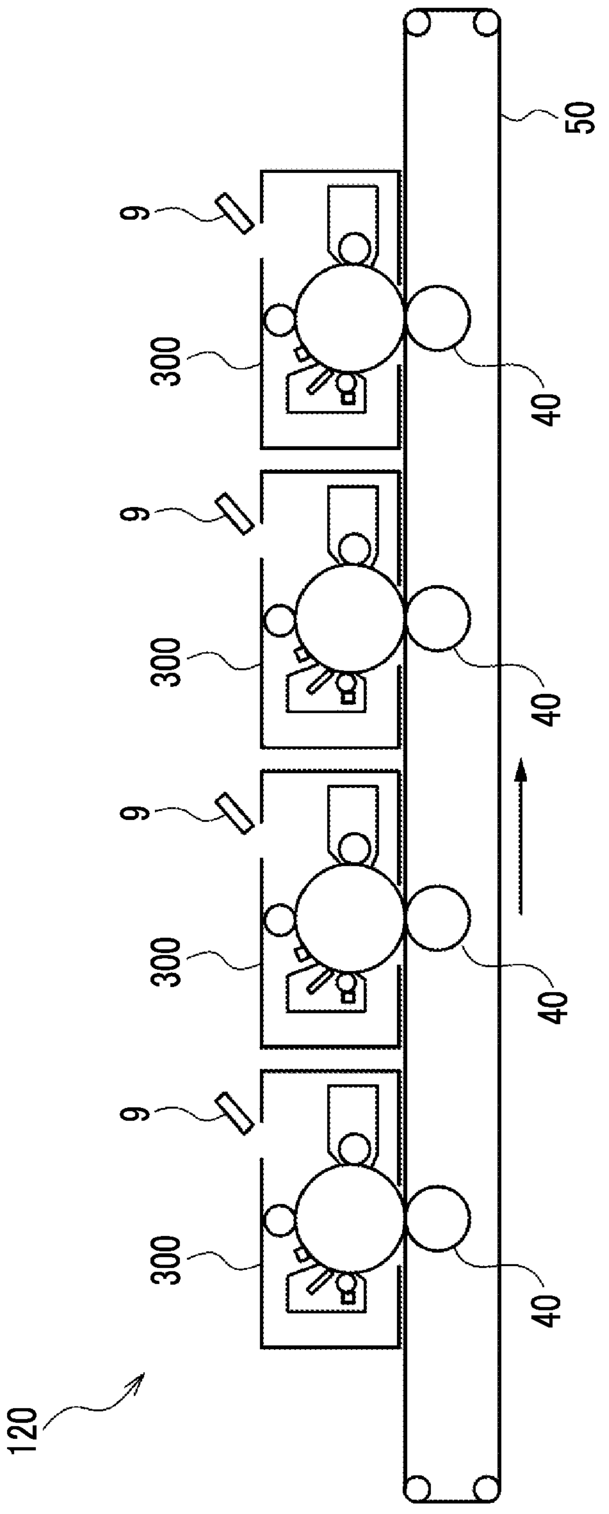
FIG. 3 is a schematic configuration view showing another example of the image forming apparatus according to the present exemplary embodiment.

FIG. 3 is a schematic configuration view showing another example of the image forming apparatus according to the present exemplary embodiment.

An image forming apparatus 120 shown in FIG. 3 is a tandem type multicolor image forming apparatus on which four process cartridges 300 are mounted. The image forming apparatus 120 is formed such that four process cartridges 300 are arranged in parallel on the intermediate transfer member 50, and one electrophotographic photoreceptor is used for each color. Further, the image forming apparatus 120 has the same configuration as the configuration of the image forming apparatus 100 except that the image forming apparatus 120 is of a tandem type.

EXAMPLES

Hereinafter, the electrophotographic photoreceptor of the present disclosure will be described in more detail with reference to examples. The materials, the used amounts, the ratios, the treatment procedures, and the like described in the following examples may be appropriately changed without departing from the spirit of the present disclosure. Therefore, the scope of the electrophotographic photoreceptor of the present disclosure should not be limitatively interpreted by the specific examples described below.

Preparation of Electrophotographic Photoreceptor

Example 1

Formation of Undercoat Layer 20 parts by mass of a blocked isocyanate (SUMIDUR BL3175, manufactured by Sumitomo Bayer Urethane Co., Ltd., solid content of 75% by mass) and 7.5 parts by mass of butyral resin (S-LEC BL-1, manufactured by Sekisui Chemical Co., Ltd.) are dissolved in 150 parts by mass of methyl ethyl ketone. 34 parts by mass of the n-type organic pigment in a purified state listed in Table 1, which is a mixture (mass ratio of 1:1) of a perinone compound (1-1) and a perinone compound (2-1) is mixed with the solution and dispersed with a sand mill using glass beads having a diameter of 1 μmm for 10 hours, thereby obtaining a dispersion liquid. 0.005 parts by mass of bismuth carboxylate (K-KAT XK-640, manufactured by King Industries, Inc.) and 2 parts by mass of silicone resin particles (TOSPEARL 145, manufactured by Momentive Performance Materials Inc.) are added to the dispersion liquid, thereby obtaining a coating solution for forming an undercoat layer. A cylindrical aluminum base material is immersed in and coated with the coating solution and dried and cured at 160° C. for 60 μminutes to form an undercoat layer having a thickness of 7 μm. The volume resistivity of the undercoat layer is measured by a ferroelectric evaluation system (IV & QV converter model 6252C type, manufactured by Toyo Technica Inc.).

Formation of Charge Generation Layer

Hydroxygallium phthalocyanine having diffraction peaks at least at positions where Bragg angles (2θ±0.2°) of the X-ray diffraction spectrum using Cuka characteristic X-ray are 7.3°, 16.0°, 24.9°, and 28.0° is prepared as the charge generation material. A mixture obtained by mixing 15 parts by mass of the hydroxygallium phthalocyanine, 10 parts by mass of a vinyl chloride-vinyl acetate copolymer resin (VMCH, Nippon Unicar Company Limited), and 200 parts by mass of n-butyl acetate is dispersed in a sand mill using glass beads having a diameter of 1 μmm for 4 hours. 175 parts by mass of n-butyl acetate and 180 parts by mass of methyl ethyl ketone are added to the dispersion liquid, and the mixture is stirred, thereby obtaining a coating solution for forming a charge generation layer. The undercoat layer is immersed in and coated with the coating solution and dried at 150° C. for 15 μminutes, thereby forming a charge generation layer having a thickness of 0.2 μm.

Formation of Charge Transport Layer 38 parts by mass of a charge transport agent (HT-1), 10 parts by mass of a charge transport agent (HT-2), and 52 parts by mass of a polycarbonate (A) (viscosity average molecular weight of 46,000) are added to 800 parts by mass of tetrahydrofuran and dissolved therein, and 7 parts by mass of a polytetrafluoroethylene resin (LUBRON L-5, manufactured by Daikin Industries, Ltd., average particle diameter of 300 nm) is added thereto and dispersed at 5,500 rpm using a homogenizer (ULTRA-TURRAX, manufactured by IKA) for 2 hours, thereby obtaining a coating solution for forming a charge transport layer. The charge generation layer is immersed in and coated with the coating solution and dried at 140° C. for 40 μminutes, thereby forming a charge transport layer having a thickness of 27 μm. A photoreceptor of Example 1 is obtained by performing the above-described treatment.

(HT-1)

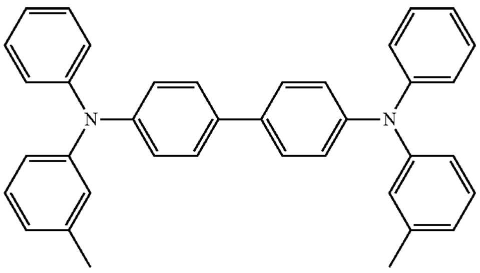

Charge transport agent (HT-2)

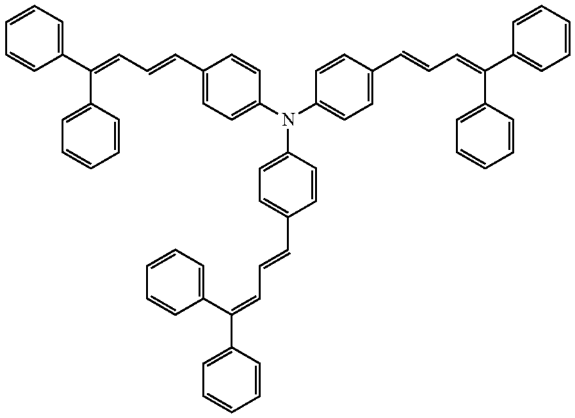

Charge transport agent (A)

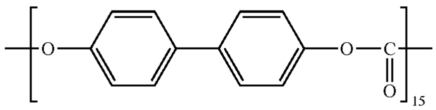

-continued

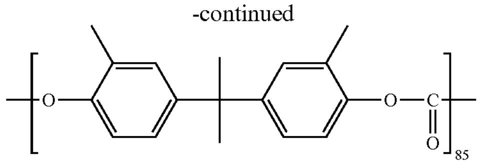

Polycarbonate

Comparative Example c1

An electrophotographic photoreceptor is obtained by the same method as in Example 1 except that the mixture of the perinone compound (1-1) and the perinone compound (2-1) (mass ratio of 1.1) which is the n-type organic pigment is changed to an unpurified perinone compound described in Example 1 of JP2020-046640A.

Comparative Example c2

An electrophotographic photoreceptor is obtained by the same method as in Comparative Example el except that the film thickness of the undercoat layer is set to the value listed in Table 1.

Example 2

A photoreceptor is prepared in the same manner as in Example 1 except that the binder resin is changed from polyurethane to polyamide in the formation of the undercoat layer and the procedure for forming the undercoat layer is changed as follows.

Formation of Undercoat Layer 22.5 parts by mass of a polyamide resin Amilan™ CM8000 (manufactured by Toray Industries, Inc.) is dissolved in 120 parts by mass of methanol and 60 parts by mass of isopropanol. 34 parts by mass of a mixture of the perinone compound (1-1) and the perinone compound (2-1) (mass ratio of 1:1) is mixed with the solution and dispersed with a sand mill using glass beads having a diameter of 1 μmm for 10 hours, thereby obtaining a dispersion liquid. A cylindrical aluminum base material is immersed in and coated with the coating solution and dried and cured at 110° C. for 40 μminutes to form an undercoat layer having a thickness of 7 μm.

Example 3

A photoreceptor is prepared in the same manner as in Example 1 except that the binder resin is changed from polyurethane to polycarbonate in the formation of the undercoat layer, and the procedure for forming the undercoat layer and the procedure for forming the charge transport layer are changed as follows.

Formation of Undercoat Layer 22.5 parts by mass of a polycarbonate resin PANLITE TS-2040 (manufactured by Teijin Ltd.) is dissolved in 160 parts by mass of tetrahydrofuran. 34 parts by mass of a mixture of the perinone compound (1-1) and the perinone compound (2-1) (mass ratio of 1:1) is mixed with the solution and dispersed with a sand mill using glass beads having a diameter of 1 μmm for 10 hours, thereby obtaining a dispersion liquid. 2 parts by mass of silicone resin particles (TOSPEARL 145, manufactured by Momentive Performance Materials Inc.) are added to the dispersion liquid, thereby obtaining a coating solution for forming an undercoat layer. A cylindrical aluminum base material is immersed in and coated with the coating solution and dried and cured at 135° C. for 50 µminutes to form an undercoat layer having a thickness of 4 µm.

Formation of Charge Transport Layer

A charge transport layer is formed by the same procedure for forming the charge transport layer as in Example 1 except that the base material is spray-coated with the coating solution instead of being immersed and coated.

Examples 4 to 9

Each photoreceptor is prepared in the same manner as in Example 1 except that the kind of the n-type organic pigment is changed as listed in Table 1 in the formation of the undercoat layer.

Example 10

A photoreceptor is prepared in the same manner as in Example 1 except that the kind of the n-type organic pigment is changed to a compound 6-1 (referred to as "6-1" in the table) shown below in the formation of the undercoat layer.

6-1

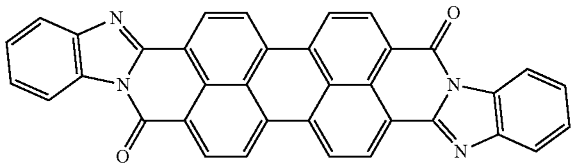

In Table 1, the purified state of each n-type organic pigment is listed in each column of "purified state" of the n-type organic pigment. Further, each purification method is as follows.

Purification Method 1: Acid Paste-Treated Material

A solution obtained by dissolving 20 g of the n-type organic pigment (manufactured by Clariant AG) in 200 µml of concentrated sulfuric acid is added dropwise to 1.5 L of distilled water over 1 hour while the temperature thereof is maintained at 20° C. The obtained suspension is centrifuged by a high-speed centrifuge (H-2000B, manufactured by Kokusan Co., Ltd.). The acidic water of the supernatant is removed by decantation. 1.0 L of distilled water is added to the residue of the remaining n-type organic pigment, the mixture is sufficiently stirred and suspended, and the n-type organic pigment is centrifuged again with a centrifuge and washed with water. The n-type organic pigment is repeatedly washed with water 20 times until the electrical conductivity of the supernatant reaches 10 S/cm or less. The washed n-type organic pigment is freeze-dried for two days and subjected to a pulverization treatment using a planetary ball mill (Classic Line, manufactured by Fritsch Japan Co., Ltd.) with zirconia beads having a diameter of 0.3 µmm at 500 rpm for 1 hour, thereby obtaining a purified n-type organic pigment.

Purification Method 2: Sublimation Purified Material 5 g of the n-type organic pigment is sublimated in a glass tube for sublimation purification at 350° C. for two days using argon gas as carrier gas. The residue and the initial sublimation component are removed, thereby obtaining 4.1 g of a purified perinone compound. The obtained n-type organic pigment is subjected to a pulverization treatment using a planetary ball mill in the same manner as in the purification method 1, thereby obtaining a purified n-type organic pigment.

Purification Method 3: Silica Gel-treated Material 1 g of the n-type organic pigment is dissolved in 200 µml of dimethyl sulfoxide (DMSO) by being heated at 150° C. The insoluble matter remaining undissolved is separated by filtration, and a DMSO solution of the n-type organic pigment is allowed to pass through 5 g of silica gel (PSQ100B, manufactured by Fuji Silysia Chemical Ltd.) at 80° C. to carry out a silica gel adsorption treatment. The obtained DMSO solution is added to 100 µml of distilled water so that crystals are precipitated, and the solution is filtered and dried in a vacuum. The dried n-type organic pigment is subjected to a pulverization treatment using a planetary ball mill in the same manner as in the purification method 1, thereby obtaining a purified n-type organic pigment.

The amount of the Fe element in the undercoat layer that is detected by high-frequency inductively coupled plasma emission spectrometric analysis is measured for the electrophotographic photoreceptor of each example by the above-described measuring method. The results are listed in the columns of "amount of Fe element" in Table 1.

In the table, for example, in a case where the photoreceptor contains a plurality of n-type organic pigments, the amount listed in the column [content [wt %]] of the n-type organic pigment denotes the total amount of the plurality of n-type organic pigments.

Performance Evaluation of Electrophotographic Photoreceptor

The photoreceptor of each example or each comparative example is mounted on a modified image forming apparatus DocuCentre C5570 (manufactured by FUJIFILM Business Innovation Corp.), and the following evaluations are performed.

Evaluation of Spot-like Image Defects

The spot-like image defects are evaluated by using the phenomenon that spot-like image defects occur in a case where a current leaks in the photoreceptor. Here, since the charging potential is typically set to approximately −700 V, the charging potential is set to a potential of −830 V where spot-like image defects are more likely to occur. 20,000 sheets of images having a density of 20% are continuously output on A4 paper, and after 10 hours, 10 sheets of images having a density of 20% are output on A4 paper in an environment of a temperature of 28° C. and a relative humidity of 80%. The presence or absence of spot-like image defects in a total of 10 images is visually observed, and the degree of image defects is classified into A to D described below. The results are listed in Table 1.

A: Spot-like image defects are not found.

B: The number of spot-like image defects is less than 5.

C: The number of spot-like image defects is 5 or greater and less than 10.

D: The number of spot-like image defects is 10 or greater.

Charge Retention Properties

A surface potential probe of a surface potential meter (TREK 334, manufactured by Trek Co., Ltd.) is installed at a position separated from the surface of the photoreceptor by 1 mm.

The surface of the photoreceptor is charged to −800 V, the amount of a decrease in potential (that is, the amount of dark decay) after 0.1 seconds is measured, and the amount of a decrease in potential is classified into A to D described below.

A: The amount of a decrease in potential is less than 15V.

B: The amount of a decrease in potential is 15 V or greater and less than 18 V.

TABLE 1

| | | n-Type organic pigment | | | Amount of Fe | Film thickness of undercoat | Evaluation | | |
|---|---|---|---|---|---|---|---|---|---|
| | Type of binder resin | Type | Purified state | Content [wt %] | element [ppm] | layer [µm] | Spot-like image defects | Charging retention properties | Sticking of foreign matter |
| Example 1 | Polyurethane resin | 1-1 and 2-1 | Acid paste-treated material | 54 | 67 | 7 | B | A | A |
| Example 2 | Polyamide resin | 1-1 and 2-1 | Acid paste-treated material | 60 | 68 | 7 | B | A | B |
| Example 3 | Polycarbonate resin | 1-1 and 2-1 | Acid paste-treated material | 58 | 67 | 4 | B | A | B |
| Example 4 | Polyurethane resin | 1-1 | Acid paste-treated material | 65 | 55 | 8 | A | A | A |
| Example 5 | Polyurethane resin | 1-2 | Sublimation purified material | 60 | 70 | 6 | B | A | A |
| Example 6 | Polyurethane resin | 2-1 | Silica gel-treated material | 60 | 30 | 7 | A | A | A |
| Example 7 | Polyurethane resin | 3-8 | Silica gel-treated material | 65 | 25 | 7 | A | A | A |
| Example 8 | Polyurethane resin | 4-5 | Acid paste-treated material | 70 | 74 | 8 | B | B | A |
| Example 9 | Polyurethane resin | 5-14 | Sublimation purified material | 68 | 66 | 6 | B | A | A |
| Example 10 | Polyurethane resin | 6-1 | Silica gel-treated material | 65 | 40 | 8 | A | A | A |
| Example 11 | Polyurethane resin | 1-1 | Sublimation purified material | 75 | 75 | 8 | B | B | A |
| Example 12 | Polyurethane resin | 2-1 | Acid paste-treated material | 82 | 30 | 7 | A | B | A |
| Example 13 | Polyurethane resin | 2-1 | Acid paste-treated material | 45 | 30 | 7 | A | A | A |
| Example 14 | Polyurethane resin | 1-1 | Sublimation purified material | 65.0 | 75 | 10 | B | B | A |
| Comparative Example c1 | Polyurethane resin | 1-1 and 2-1 | — | 54 | 88 | 7 | C | C | C |
| Comparative Example c2 | Polyurethane resin | 1-1 and 2-1 | — | 54 | 88 | 10 | D | D | D |

C: The amount of a decrease in potential is 18 V or greater and less than 20 V.

D: The amount of a decrease in potential is 20 V or greater.

Evaluation of Sticking of Foreign Matter

The suppression of foreign matter from being stuck is evaluated using a phenomenon in which a current flows and spot-like image defects are generated in a case where carbon fibers penetrate through the photosensitive layer and the undercoat layer and reach the aluminum base material. Here, since the charging potential is typically set to approximately −700 V, the charging potential is set to a potential of −830 V where spot-like image defects caused by sticking of foreign matter are more likely to occur. Carbon fibers (average diameter of 7 µm, average length of 30 µm) are mixed with the developer in an amount set such that the density reaches 0.2% by mass, and 20,000 sheets of images having a density of 20% are continuously output on A4 paper. Next, 10 sheets of images having a density of 20% are output on A4 paper. The presence or absence of spot-like image defects in a total of 10 images is visually observed, and the degree of image defects is classified into A to D described below. The results are listed in Table 1.

A: Spot-like image defects are not found.

B: The number of spot-like image defects is less than 5.

C: The number of spot-like image defects is 5 or greater and less than 10.

D: The number of spot-like image defects is 10 or greater.

As listed in Table 1, it is found that spot-like image defects caused by the leakage current are reduced in the electrophotographic photoreceptors of the examples as compared with the electrophotographic photoreceptors of the comparative examples. Further, even in a case where needle-like foreign matter, which is a condition that spot-like image defects are more likely to occur, is stuck into the surface of the electrophotographic photoreceptor, the occurrence of spot-like image defects are reduced in the electrophotographic photoreceptors of the examples. Further, it is found that the electrophotographic photoreceptors of the examples have excellent charge retention properties as compared with the electrophotographic photoreceptors of the comparative examples.

(((1))) An electrophotographic photoreceptor comprising:

a conductive substrate;

an undercoat layer provided on the conductive substrate and containing a binder resin and an n-type organic pigment; and a photosensitive layer provided on the undercoat layer, wherein an amount of an Fe element in the undercoat layer that is detected by high-frequency inductively coupled plasma emission spectrometric analysis is 80 ppm or less.

(((2))) The electrophotographic photoreceptor according to (((1))), wherein the n-type organic pigment includes at least one n-type organic pigment selected from the group consisting of compounds represented by General Formulae (1), (2), (3), (4), and (5), in General Formula (1), $R^{11}$, $R^{12}$, $R^{13}$, $R^{14}$, $R^{15}$, $R^{16}$, $R^{17}$, and $R^{18}$ each independently represent a hydrogen atom, an alkyl group, an alkoxy group, an aralkyl group, an aryl group, an aryloxy group, an alkoxycarbonyl group, an aryloxycarbonyl group, an alkoxycarbonylalkyl group, an aryloxycarbonylalkyl group, or a halogen atom, $R^{11}$ and $R^{12}$, $R^{12}$ and $R^{13}$, and $R^{13}$ and $R^{14}$ may be each independently linked to each other to form a ring, and $R^{15}$ and $R^{16}$, $R^{16}$ and $R^{17}$, and $R^{17}$ and $R^{18}$ may be each independently linked to each other to form a ring, in General Formula (2), $R^{21}$, $R^{22}$, $R^{23}$, $R^{24}$, $R^{25}$, $R^{26}$, $R^{27}$, and $R^{28}$ each independently represent a hydrogen atom, an alkyl group, an alkoxy group, an aralkyl group, an aryl group, an aryloxy group, an alkoxycarbonyl group, an aryloxycarbonyl group, an alkoxycarbonylalkyl group, an aryloxycarbonylalkyl group, or a halogen atom, $R^{21}$ and $R^{22}$, $R^{22}$ and $R^{23}$, and $R^{23}$ and $R^{24}$ may be each independently linked to each other to form a ring, and $R^{25}$ and $R^{26}$, $R^{26}$ and $R^{27}$, and $R^{27}$ and $R^{28}$ may be each independently linked to each other to form a ring, in General Formula (3), $R^{31}$, $R^{32}$, $R^{33}$, $R^{34}$, $R^{35}$, and $R^{36}$ each independently represent a hydrogen atom, an alkyl group, an alkoxy group, an aralkyl group, an aryl group, an alkoxycarbonyl group, or a halogen atom, in General Formula (4), $R^{41}$, $R^{42}$, $R^{43}$, $R^{44}$, $R^{45}$, $R^{46}$, $R^{47}$, $R^{48}$, $R^{49}$, and $R^{50}$ each independently represent a hydrogen atom, an alkyl group, an alkoxy group, an aralkyl group, an aryl group, an alkoxycarbonyl group, or a halogen atom, in General Formula (5), $R^{51}$ and $R^{52}$ each independently represent a hydrogen atom, an alkyl group, an alkoxy group, an aralkyl group, an aryl group, an alkoxycarbonyl group, or a halogen atom.

General Formula (1)

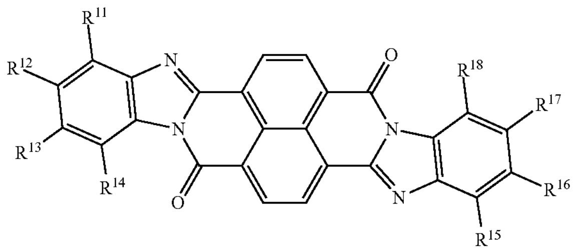

General Formula (2)

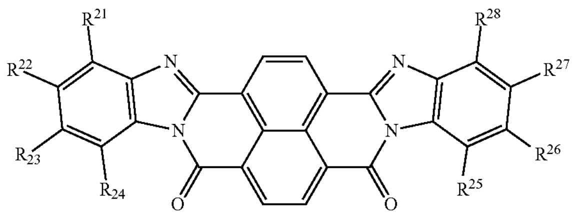

-continued

General Formula (3)

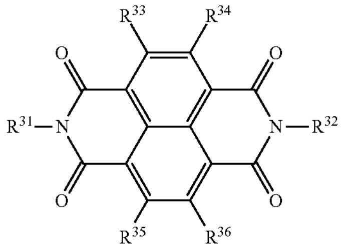

General Formula (4)

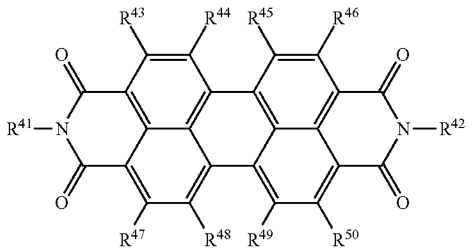

General Formula (5)

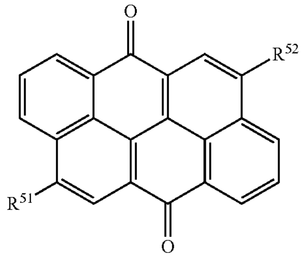

(((3))) The electrophotographic photoreceptor according to (((2))), wherein the n-type organic pigment contains at least one of a compound represented by General Formula (1) or a compound represented by General Formula (2).

(((4))) The electrophotographic photoreceptor according to any one of (((1))) to (((3))), wherein a content of the n-type organic pigment is 50% by mass or greater with respect to a total solid content of the undercoat layer.

(((5))) The electrophotographic photoreceptor according to (((4))), wherein the content of the n-type organic pigment is 50% by mass or greater and 80% by mass or less with respect to the total solid content of the undercoat layer.

(((6))) The electrophotographic photoreceptor according to any one of (((1))) to (((5))), wherein the undercoat layer has a thickness of 10 μm or greater.

(((7))) A process cartridge comprising:

the electrophotographic photoreceptor according to any one of (((1))) to (((6))), wherein the process cartridge is attachable to and detachable from an image forming apparatus.

(((8))) An image forming apparatus comprising:

the electrophotographic photoreceptor according to any one of (((1))) to (((6)));

a charging unit that charges a surface of the electrophotographic photoreceptor;

an electrostatic latent image forming unit that forms an electrostatic latent image on the charged surface of the electrophotographic photoreceptor;

a developing unit that develops the electrostatic latent image formed on the surface of the electrophotographic photoreceptor with a developer containing a toner to form a toner image; and a transfer unit that transfers the toner image to a surface of a recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrophotographic photoreceptor comprising:

a conductive substrate;

an undercoat layer provided on the conductive substrate and containing a binder resin and an n-type organic pigment; and a photosensitive layer provided on the undercoat layer, wherein an amount of an Fe element in the undercoat layer that is detected by high-frequency inductively coupled plasma emission spectrometric analysis is in a range from 25 ppm or more to 80 ppm or less.

2. The electrophotographic photoreceptor according to claim 1, wherein the n-type organic pigment includes at least one n-type organic pigment selected from the group consisting of compounds represented by General Formulae (1), (2), (3), (4), and (5), in General Formula (1), $R^{11}$, $R^{12}$, $R^{13}$, $R^{14}$, $R^{15}$, $R^{16}$, $R^{17}$, and $R^{18}$ each independently represent a hydrogen atom, an alkyl group, an alkoxy group, an aralkyl group, an aryl group, an aryloxy group, an alkoxycarbonyl group, an aryloxycarbonyl group, an alkoxycarbonylalkyl group, an aryloxycarbonylalkyl group, or a halogen atom, $R^{11}$ and $R^{12}$, $R^{12}$ and $R^{13}$, and $R^{13}$ and $R^{14}$ may be each independently linked to each other to form a ring, and $R^{15}$ and $R^{16}$, $R^{16}$ and $R^{17}$, and $R^{17}$ and $R^{18}$ may be each independently linked to each other to form a ring, in General Formula (2), $R^{21}$, $R^{22}$, $R^{23}$, $R^{24}$, $R^{25}$, $R^{26}$, $R^{27}$, and $R^{28}$ each independently represent a hydrogen atom, an alkyl group, an alkoxy group, an aralkyl group, an aryl group, an aryloxy group, an alkoxycarbonyl group, an aryloxycarbonyl group, an alkoxycarbonylalkyl group, an aryloxycarbonylalkyl group, or a halogen atom, $R^{21}$ and $R^{22}$, $R^{22}$ and $R^{23}$, and $R^{23}$ and $R^{24}$ may be each independently linked to each other to form a ring, and $R^{25}$ and $R^{26}$, $R^{26}$ and $R^{27}$, and $R^{27}$ and $R^{28}$ may be each independently linked to each other to form a ring, in General Formula (3), $R^{31}$, $R^{32}$, $R^{33}$, $R^{34}$, $R^{35}$, and $R^{36}$ each independently represent a hydrogen atom, an alkyl group, an alkoxy group, an aralkyl group, an aryl group, an alkoxycarbonyl group, or a halogen atom, in General Formula (4), $R^{41}$, $R^{42}$, $R^{43}$, $R^{44}$, $R^{45}$, $R^{46}$, $R^{47}$, $R^{48}$, $R^{49}$, and $R^{50}$ each independently represent a hydrogen atom, an alkyl group, an alkoxy group, an aralkyl group, an aryl group, an alkoxycarbonyl group, or a halogen atom, in General Formula (5), $R^{51}$ and $R^{52}$ each independently represent a hydrogen atom, an alkyl group, an alkoxy group, an aralkyl group, an aryl group, an alkoxycarbonyl group, or a halogen atom.

General Formula (1)

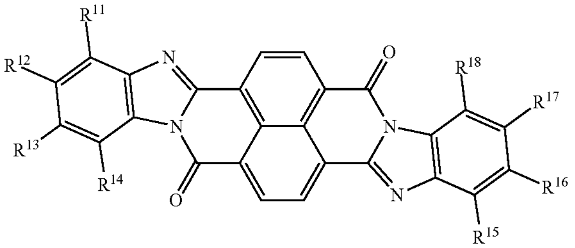

General Formula (2)

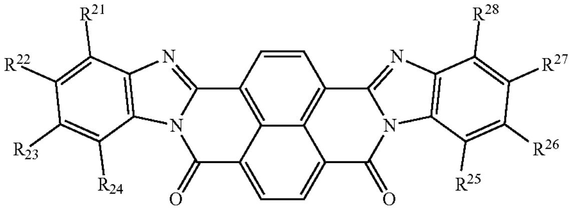

General Formula (3)

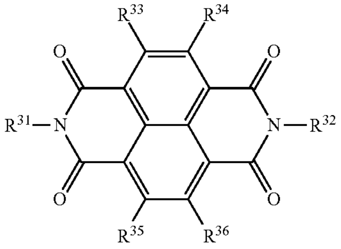

General Formula (4)

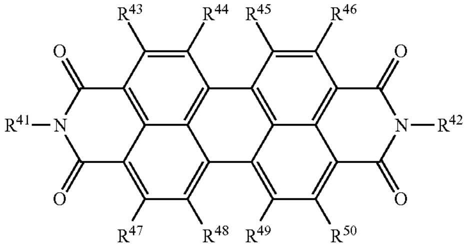

General Formula (5)

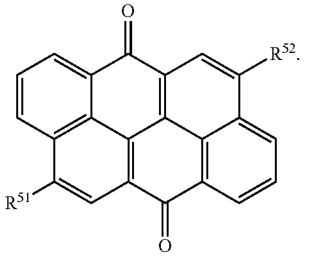

3. The electrophotographic photoreceptor according to claim 2, wherein the n-type organic pigment contains at least one of a compound represented by General Formula (1) or a compound represented by General Formula (2).

4. The electrophotographic photoreceptor according to claim 1, wherein a content of the n-type organic pigment is 50% by mass or greater with respect to a total solid content of the undercoat layer.

5. The electrophotographic photoreceptor according to claim 4, wherein the content of the n-type organic pigment is 50% by mass or greater and 80% by mass or less with respect to the total solid content of the undercoat layer.

6. The electrophotographic photoreceptor according to claim 1, wherein the undercoat layer has a thickness of 10 μm or greater.

7. A process cartridge comprising:

the electrophotographic photoreceptor according to claim 1 wherein the process cartridge is attachable to and detachable from an image forming apparatus.

8. A process cartridge comprising:

the electrophotographic photoreceptor according to claim 2 wherein the process cartridge is attachable to and detachable from an image forming apparatus.

9. A process cartridge comprising:

the electrophotographic photoreceptor according to claim 3 wherein the process cartridge is attachable to and detachable from an image forming apparatus.

10. A process cartridge comprising:

the electrophotographic photoreceptor according to claim 4 wherein the process cartridge is attachable to and detachable from an image forming apparatus.

11. A process cartridge comprising:

the electrophotographic photoreceptor according to claim 5 wherein the process cartridge is attachable to and detachable from an image forming apparatus.

12. A process cartridge comprising:

the electrophotographic photoreceptor according to claim 6 wherein the process cartridge is attachable to and detachable from an image forming apparatus.

13. An image forming apparatus comprising:

the electrophotographic photoreceptor according to claim 1;

a charging unit that charges a surface of the electrophotographic photoreceptor;

an electrostatic latent image forming unit that forms an electrostatic latent image on the charged surface of the electrophotographic photoreceptor;

a developing unit that develops the electrostatic latent image formed on the surface of the electrophotographic photoreceptor with a developer containing a toner to form a toner image; and a transfer unit that transfers the toner image to a surface of a recording medium.

14. An image forming apparatus comprising:

the electrophotographic photoreceptor according to claim 2;

a charging unit that charges a surface of the electrophotographic photoreceptor;

an electrostatic latent image forming unit that forms an electrostatic latent image on the charged surface of the electrophotographic photoreceptor;

a developing unit that develops the electrostatic latent image formed on the surface of the electrophotographic photoreceptor with a developer containing a toner to form a toner image; and a transfer unit that transfers the toner image to a surface of a recording medium.

15. An image forming apparatus comprising:

the electrophotographic photoreceptor according to claim 3;

a charging unit that charges a surface of the electrophotographic photoreceptor;

an electrostatic latent image forming unit that forms an electrostatic latent image on the charged surface of the electrophotographic photoreceptor;

a developing unit that develops the electrostatic latent image formed on the surface of the electrophotographic photoreceptor with a developer containing a toner to form a toner image; and a transfer unit that transfers the toner image to a surface of a recording medium.

16. An image forming apparatus comprising:

the electrophotographic photoreceptor according to claim 4;

a charging unit that charges a surface of the electrophotographic photoreceptor;

an electrostatic latent image forming unit that forms an electrostatic latent image on the charged surface of the electrophotographic photoreceptor;

a developing unit that develops the electrostatic latent image formed on the surface of the electrophotographic photoreceptor with a developer containing a toner to form a toner image; and a transfer unit that transfers the toner image to a surface of a recording medium.

17. An image forming apparatus comprising:

the electrophotographic photoreceptor according to claim 5;

a charging unit that charges a surface of the electrophotographic photoreceptor;

an electrostatic latent image forming unit that forms an electrostatic latent image on the charged surface of the electrophotographic photoreceptor;

a developing unit that develops the electrostatic latent image formed on the surface of the electrophotographic photoreceptor with a developer containing a toner to form a toner image; and a transfer unit that transfers the toner image to a surface of a recording medium.

18. An image forming apparatus comprising:

the electrophotographic photoreceptor according to claim 6;

a charging unit that charges a surface of the electrophotographic photoreceptor;

an electrostatic latent image forming unit that forms an electrostatic latent image on the charged surface of the electrophotographic photoreceptor;

a developing unit that develops the electrostatic latent image formed on the surface of the electrophotographic photoreceptor with a developer containing a toner to form a toner image; and a transfer unit that transfers the toner image to a surface of a recording medium.

* * * * *